US010284742B2

(12) United States Patent
Kida

(10) Patent No.: US 10,284,742 B2
(45) Date of Patent: May 7, 2019

(54) EXPOSURE APPARATUS, IMAGE FORMATION APPARATUS, AND METHOD OF MANUFACTURING EXPOSURE APPARATUS

(71) Applicant: Oki Data Corporation, Tokyo (JP)

(72) Inventor: Manabu Kida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/708,384

(22) Filed: Sep. 19, 2017

(65) Prior Publication Data
US 2018/0091691 A1 Mar. 29, 2018

(30) Foreign Application Priority Data

Sep. 23, 2016 (JP) .................. 2016-185981
Jul. 24, 2017 (JP) .................. 2017-142686

(51) Int. Cl.
H04N 1/00 (2006.01)
H04N 1/03 (2006.01)
H04N 1/024 (2006.01)
H04N 1/028 (2006.01)

(52) U.S. Cl.
CPC ....... H04N 1/0306 (2013.01); H04N 1/02463 (2013.01); H04N 1/02865 (2013.01)

(58) Field of Classification Search
CPC .................... H04N 1/0301–1/0318
See application file for complete search history.

(56) References Cited

U.S. PATENT DOCUMENTS

| 5,321,429 A * | 6/1994 | Ono ............... B41J 2/45 174/520 |
| 6,045,240 A * | 4/2000 | Hochstein ......... B60Q 1/2696 362/294 |
| 6,481,130 B1 * | 11/2002 | Wu ............... F21V 13/04 362/297 |
| 9,360,839 B2 * | 6/2016 | Imai ............... G03G 21/20 |
| 2010/0092214 A1 * | 4/2010 | Itou ............... B41J 2/45 399/220 |
| 2011/0266579 A1 * | 11/2011 | Nagai ............... H01L 27/156 257/98 |
| 2017/0184994 A1 * | 6/2017 | Imai ............... G03G 15/04036 |

FOREIGN PATENT DOCUMENTS

JP 2009-073041 A 4/2009

* cited by examiner

Primary Examiner — Christle I Marshall
(74) Attorney, Agent, or Firm — Metrolexis Law Group, PLLC

(57) ABSTRACT

An exposure apparatus according to an embodiment includes: a board that includes a first surface on which a light emitting element is arranged and a second surface opposite to the first surface; a lens member on which light from the light emitting element is incident; a holder that holds the lens member; and an insulation sheet formed of an insulation material. The board includes an abutment part provided on a second surface of the board. The insulation sheet is fixed to the holder while being in contact with the abutment part.

20 Claims, 23 Drawing Sheets

16

16

EXPOSURE APPARATUS, IMAGE FORMATION APPARATUS, AND METHOD OF MANUFACTURING EXPOSURE APPARATUS

CROSS REFERENCE TO RELATED APPLICATIONS

This application claims priority based on 35 USC 119 from prior Japanese Patent Applications No. 2016-185981 filed on Sep. 23, 2016, entitled "EXPOSURE APPARATUS, IMAGE FORMATION APPARATUS, AND METHOD OF MANUFACTURING EXPOSURE APPARATUS" and No. 2017-142686 filed on Jul. 24, 2017, entitled "EXPOSURE APPARATUS, IMAGE FORMATION APPARATUS, AND METHOD OF MANUFACTURING EXPOSURE APPARATUS", the entire contents of which are incorporated herein by reference.

BACKGROUND

The present disclosure relates to an exposure apparatus, an image formation apparatus, and a method of manufacturing the exposure apparatus. This disclosure is preferably applicable to an exposure apparatus equipped in an electrophotographic image formation apparatus, for example.

As a conventional image formation apparatus, widely used is an image formation apparatus that prints an image by causing an exposure apparatus which emits light for exposure to illuminate a surface of a photoreceptor drum with light to form an electrostatic latent image on the surface of the photoreceptor drum, and then applying toner to the thus-formed electrostatic latent image to develop a toner image. As the exposure apparatus, there is, for example, a light emitting diode (LED) head which uses light emitted from LEDs as light emitting elements.

The LED head has, for example, a board on which an LED array including linearly arranged LEDs is mounted, a rod lens array in which lenses for condensing light emitted from the respective LEDs are aligned, a holder that holds the board and the rod lens array, and a base that presses the board against the holder (e.g., see Patent Literature 1: Japanese Patent Application Publication No. 2009-073041). The LED head forms the latent static image on the surface of the photoreceptor drum disposed on an imaging position of the rod lens array by exposing the surface of the photoreceptor drum to light which is emitted from the LED array equipped on the board and is converged through the rod lens array.

SUMMARY

Such an LED head is desired to have a simplified configuration without having a base.

An embodiment proposes an exposure apparatus achieving a simplified configuration, an image formation apparatus including the exposure apparatus, and a method of manufacturing the exposure apparatus.

A first aspect is an exposure apparatus that includes: a board that includes a first surface on which a light emitting element is arranged and a second surface opposite to the first surface; a lens member on which light from the light emitting element is incident; a holder that holds the lens member; and an insulation sheet formed of an insulation material. The board includes an abutment part provided on a second surface of the board. The insulation sheet is fixed to the holder while being in contact with the abutment part.

A second aspect is a method of manufacturing an exposure apparatus. The method includes: assembling a board that includes a first surface on which a light emitting element is arranged and a holder that holds a lens member on which light from the light emitting element is incident, and pressing an insulation sheet formed of an insulation material, at a position above an abutment part arranged on a second surface of the board opposite to the first surface, thereby fixing the insulation sheet to the holder with the insulation sheet abutting on the abutment part.

A third aspect is a method of manufacturing an exposure apparatus. The method includes: assembling a board that includes a first surface on which a light emitting element is arranged and a second surface opposite to the first surface and a holder that holds a lens member on which light from the light emitting element is incident; applying a sealing material between the board and the holder; and curing the sealing material while pressing an insulation sheet against an abutment part provided on the second surface of the board and against the sealing material, thereby fixing the board to the holder and fixing the insulation sheet to the holder by means of the cured sealing material with the insulation sheet in contact with the abutment part.

According to at least one of the above aspects, the board can be fixed to the holder without additionally using a base by pressing the abutment parts of the board with the insulation sheet interposed in between and pressing the board against the holder until the board is bonded to the holder.

Accordingly, an exposure apparatus having a configuration that can be simplified, an image formation apparatus including the exposure apparatus, and a method of manufacturing the exposure apparatus can be achieved.

BRIEF DESCRIPTION OF DRAWINGS

FIG. 14A is a plan view, and FIG. 14B is an enlarged plan view of a vicinity of a left end in FIG. 14A;

FIG. 15A is a plan view, and FIG. 15B is an enlarged plan view of a left end in FIG. 15A;

DETAILED DESCRIPTION

Figure 1:
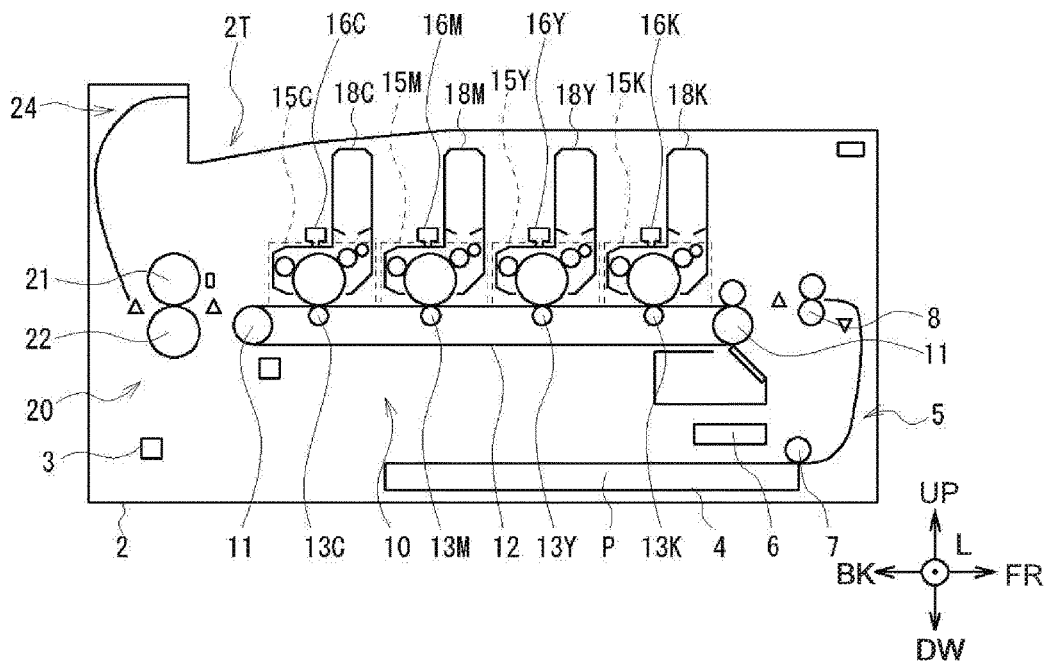
FIG. 1 is a left-side view illustrating a configuration of a color printer according to one or more embodiments.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only. Note that in the figures, reference numerals "UP", "DW", "FR", "BK", "L", and "R" means up, down, front, back, left, and right.

1. First Embodiment

[1-1. Configuration of Color Printer]

As illustrated in the left-side view in FIG. 1, a color printer 1 is an electrophotographic color printer that prints a desired color image on paper P having a size such as A3 or A4, for example. The color printer 1 as an image formation apparatus includes an almost-box shaped printer housing 2 in which various parts are arranged. Incidentally, the right end portion in FIG. 1 is defined as a front face of the color printer 1, and the up-down direction, the right-left direction, and the front-back direction in a case of facing the front face are defined, respectively. Following descriptions are based on these definitions. The color printer 1 uses a controller 3 to integrally control the entirety of the color printer 1. Through a not-illustrated communication processor, this controller 3 is connected via wiring or wirelessly with a higher-level apparatus such as a personal computer (not illustrated). Once image data indicating a color image to be printed is obtained from the higher-level apparatus and printing of the color image is instructed, the controller 3 executes printing processing to form a print image on a surface of the paper P.

At the lowermost portion in the printer housing 2, a paper container cassette 4 for containing the paper P, a paper feeder 5 for separately feeding the stacked paper P contained in the paper container cassette 4 one by one, and a paper color colorimeter 6 for measuring the color of the paper P are provided. The paper feeder 5 is located at a front end upper side of the paper container cassette 4, and includes not only rollers such as a hopping roller 7, which is provided at the front end upper side of the paper container cassette 4 and has a center axis directed in the right-left direction, and a registration roller 8 provided above the hopping roller 7, but also other elements such as a guide for guiding the paper P.

While the hopping roller 7, the registration roller 8, and the like are rotated under control of the controller 3, the paper feeder 5 separately takes out the paper P contained in the paper container cassette 4 one by one and sends the taken paper P frontward and upward. Thereafter, the paper feeder 5 puts the paper P at a position near the center in the up-down direction of a vicinity of the front end in the printer housing 2 and sends the paper P in such a way as to be returned backward. The paper color colorimeter 6 measures the color of the paper P and supplies the result to the controller 3.

Above the paper container cassette 4 in the printer housing 2, a transfer belt unit 10 is provided in such a way as to largely across the printer housing 2 in the front-back direction. In the transfer belt unit 10, elongated cylindrical rollers 11 each having a center axis directed in the right-left direction are arranged in front and back of the transfer belt unit 10, and a transfer belt 12 is suspended in such a way as to move around the front and the back rollers 11. The transfer belt 12 is formed as an endless belt that has a wide width in the right-left direction and travels in accordance with the rotation of the rollers 11. The transfer belt unit 10 makes the transfer belt 12 travel by rotating the rollers 11 under control of the controller 3, and puts the paper P received from the paper feeder 5 on an upper surface of the transfer belt 12 to transport it backward.

In addition, at an upper side of the transfer belt unit 10, that is, at a position where is higher than the center of the printer housing 2, four image formation units 15C, 15M, 15Y, and 15K illustrated in FIG. 2 (hereinafter called an image formation unit 15 as a whole) are arranged in this order from the back side to the front side. In other words, the image formation unit 15 for respective colors is arranged in a manner so-called tandem. The image formation units 15C, 15M, 15Y, and 15K respectively correspond to colors cyan (C), magenta (M), yellow (Y), and black (K). Configurations of the image formation units 15C, 15M, 15Y, and 15K are the same, but only the colors of toner corresponding to them are different from each other. The image formation unit 15 has an almost-box shape that is comparatively long in the right-left direction in order to correspond to the right-left width of the paper P.

In the printer housing 2, LED heads 16C, 16M, 16Y, and 16K (hereinafter called an LED head 16 as a whole) are provided to correspond to the respective image formation units 15C, 15M, 15Y, and 15K. This LED head 16 is made in a cuboid shape that is elongated in the right-left direction.

In the LED head 16, LEDs are arranged to be aligned along the right-left direction, and the LED head 16 makes each LED emits light in a light emission pattern corresponding to the image data supplied from the controller 3. The image formation unit 15 is adapted to be very close to the LED head 16 when being attached to the printer housing 2, and exposure processing is executed by the light from the LED head 16.

Toner cartridges 18C, 18M, 18Y, and 18K (hereinafter called a toner cartridge 18 as a whole) are connected above the respective image formation units 15C, 15M, 15Y, and 15K. The toner cartridge 18 is a hollow container that is long in the right-left direction. In each of the toner cartridge 18, powdery toner of each color is stored and a predetermined stirring mechanism is incorporated. Incidentally, in the transfer belt unit 10, transfer rollers 13C, 13M, 13Y, and 13K (hereinafter called a transfer roller 13 as a whole) are respectively provided on four positions directly under each of the image formation unit 15 between the front and back rollers 11. In other words, an upper side portion of the transfer belt 12 is sandwiched between each of the image formation unit 15 and each of the transfer rollers 13. Incidentally, the transfer roller 13 is adapted to be able to be charged.

Under control of the controller 3, the toner is supplied to the image formation unit 15 from the toner cartridge 18. Also, under control of the controller 3, the LED head 16 emits light to form the light emission pattern corresponding to the image data supplied from the higher-level apparatus (not illustrated). In accordance with this, each of the image formation unit 15 uses the toner supplied from the toner cartridge 18 to form a toner image corresponding to the light emission pattern of the LED head 16, and then transfers this toner image onto each of the paper P (details thereof are described later). Four colors toner images corresponding to the image data are thus sequentially transferred onto the paper P transported by the transfer belt unit 10.

In back of the transfer belt unit 10, that is in a vicinity of the center in the up-down direction of a vicinity of a back end of the printer housing 2, a fuser unit 20 is provided. The fuser unit 20 includes a heat roller 21 and a pressure roller 22. The heat roller 21 is formed in a cylindrical shape having a center axis directed in the right-left direction and provided with a heater therein. The pressure roller 22 is formed in a cylindrical shape similar to the heat roller 21, and an upper surface thereof is pressed against a lower surface of the heat roller 21 with a predetermined pressing force. Under control of the controller 3, this fuser unit 20 heats the heat roller 21 and rotates the heat roller 21 and the pressure roller 22 respectively in predetermined directions. In this way, the fuser unit 20 fuses the toner by applying heat and pressure to the paper P received from the transfer belt unit 10, that is, the paper P on which the four colors toner images are put, and then transports the paper P further backward and upward.

In back of and above the fuser unit 20, a deliverer 24 is arranged. The deliverer 24 includes a combination of rollers each having a center axis directed in the right-left direction (not illustrated), a guide for guiding the paper, and the like. The deliverer 24 appropriately rotates each roller under control of the controller 3 to allow the paper P received from the fuser unit 20 to be transported backward and upward, then returned to the front, and delivered to a delivery tray 2T formed on an upper surface of the printer housing 2.

Hence, when executing the printing processing, the color printer 1 allows the LED head 16 to emit light to form the toner images by using the image formation unit 15 of respective colors and to transfer the toner images sequentially onto the paper P.

[1-2. Configuration of Image Formation Unit]

Next, a configuration of the image formation unit 15 is described. As illustrated in FIG. 2, the image formation unit 15 has an outer periphery mostly covered by a frame 31 while forming a comparatively large space therein.

In the lower center inside the image formation unit 15, a photoreceptor drum 35 is provided. The photoreceptor drum 35 is formed in a cylindrical shape having a center axis directed in the right-left direction and is supported by the frame 31 while being rotatable around the center axis. Incidentally, the photoreceptor drum 35 is rotated in an arrow R1 direction by a driving force transmitted from a not-illustrated motor.

A part of the frame 31 corresponding to a lower surface of the photoreceptor drum 35 is comparatively widely opened. With this, when being attached to the printer housing 2 (FIG. 1), the image formation unit 15 allows the lower surface of the photoreceptor drum 35 to contact with the transfer belt 12 or the paper P on the transfer belt 12. In a part of the frame 31 directly above the photoreceptor drum 35, an exposure hole elongated in the right-left direction is drilled.

In back of and above the photoreceptor drum 35, a charge roller 36 in a cylindrical shape having a diameter smaller than that of the photoreceptor drum 35 is provided. The charge roller 36 is made of, for example, a semi-conductive elastic material. A peripheral side surface of the charge roller 36 is abutted on a peripheral side surface 35S of the photoreceptor drum 35 to uniformly charge the abutted portion of the peripheral side surface 35S.

In front of and above the photoreceptor drum 35, a developer roller 38 in a cylindrical shape having a diameter smaller than that of the photoreceptor drum 35 is provided. The developer roller 38 is made of a semi-conductive urethane rubber that is, for example, a urethane rubber material to which a conductive substance such as carbon is applied and thus electric resistance is appropriately adjusted, and the developer roller 38 can be charged. This developer roller 38 includes a peripheral side surface in which the back side thereof is abutted on the peripheral side surface 35S of the photoreceptor drum 35 while the front side thereof is abutted on a supply roller 39 in a cylindrical shape having a diameter slightly smaller than that of the developer roller 38. The supply roller 39 is made of, for example, a semi-conductive silicone foam sponge.

In back of and above the developer roller 38, a developer blade 40 like a thin plate is provided. The developer blade 40 is made of a metal such as stainless and phosphor bronze, or a rubber material such as silicone rubber. This developer blade 40 includes a back upper end fixed in the frame 31 and forms a small gap between a front lower part thereof and the peripheral side surface of the developer roller 38.

Further, on both right and left sides above the photoreceptor drum 35, spacers 45 are provided. The size of the spacers 45, positions of the spacers 45 attached to the frame 31, and the like are optimized. Abutting a lower surface of the LED head 16 on upper surfaces of the spacers 45 adjusts a spacing between the peripheral side surface of the photoreceptor drum 35 and the LED head 16 to a desired length.

According to the above configuration, when printing an image on the paper P, under control of the controller 3, the image formation unit 15 rotates the photoreceptor drum 35 in the arrow R1 direction, rotates the charge roller 36, the developer roller 38, and the supply roller 39 in an arrow R2 direction, as well as charges the charge roller 36 and the developer roller 38.

Regarding the photoreceptor drum 35, first, a back upper side portion of the peripheral side surface 35S is uniformly charged by the charge roller 36, and then the charged portion is reached a vicinity of the upper end by the rotation in the arrow R1 direction, thereby facing the LED head 16. At this time, the peripheral side surface 35S of the photoreceptor drum 35 is exposed to the light emitted from the LED head 16 in the light emission pattern corresponding to the image data, and the electrostatic latent image corresponding to the image data is thus formed.

In addition, regarding the developer roller 38 rotated in the arrow R2 direction, the toner supplied from the toner cartridge 18 is applied to the peripheral side surface thereof by the supply roller 39, and then excessive toner is scraped off by the developer blade 40. This allows the toner to be evenly applied like a thin film to the peripheral side surface.

While further rotating in the arrow R1 direction, in a vicinity of its front end where the photoreceptor drum 35 abuts on the developer roller 38, the photoreceptor drum 35 applies the toner formed like a thin film on the peripheral side surface of the developer roller 38 to only a part of the peripheral side surface 35S corresponding to the electrostatic latent image. The toner image corresponding to the image data is thus formed on the peripheral side surface 35S of the photoreceptor drum 35. Incidentally, at this time, the toner image formed on the peripheral side surface 35S is one of the images that should be printed eventually, which is represented with only one color component of the image formation unit 15 (i.e., any one of cyan, magenta, yellow, and black).

Thereafter, while further rotating in the arrow R1 direction, the photoreceptor drum 35 allows the toner image to reach a vicinity of its lower end. At this time, the controller 3 controls the transfer belt unit 10 (FIG. 1) to make the paper P reach beneath the image formation unit 15 while charges the transfer roller 13 in a property opposite to the toner. With this, in the image formation unit 15, the paper P is sandwiched between the part of the photoreceptor drum 35 on which the toner image is formed and the charged transfer roller 13, and thus the toner image is transferred onto the paper P. Incidentally, when the toner remains on the peripheral side surface 35S of the photoreceptor drum 35 after the toner image is transferred onto the paper P, a not-illustrated cleaning apparatus removes the toner.

Hence, the image formation unit 15 allows the LED head 16 to face the vicinity of the photoreceptor drum 35, and forms the toner image on the peripheral side surface 35S with the exposing operation of the LED head 16.

[1-3. Configuration of LED Head]

Figure 3A:
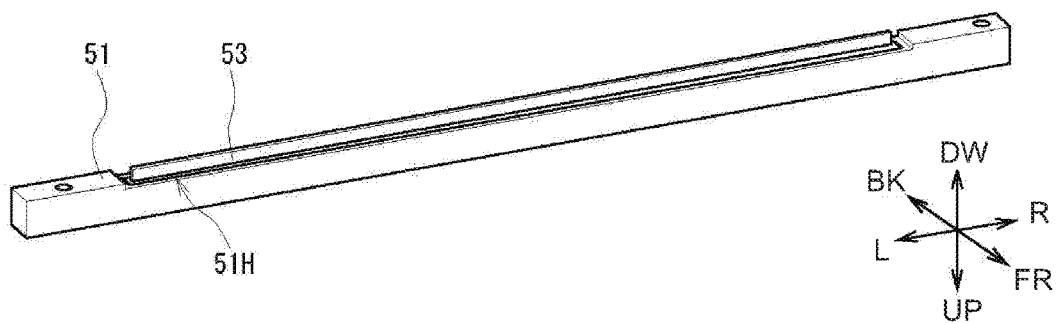
FIGS. 3A and 3B are perspective views illustrating an LED head configuration (1) according to a first embodiment.
Figure 3B:
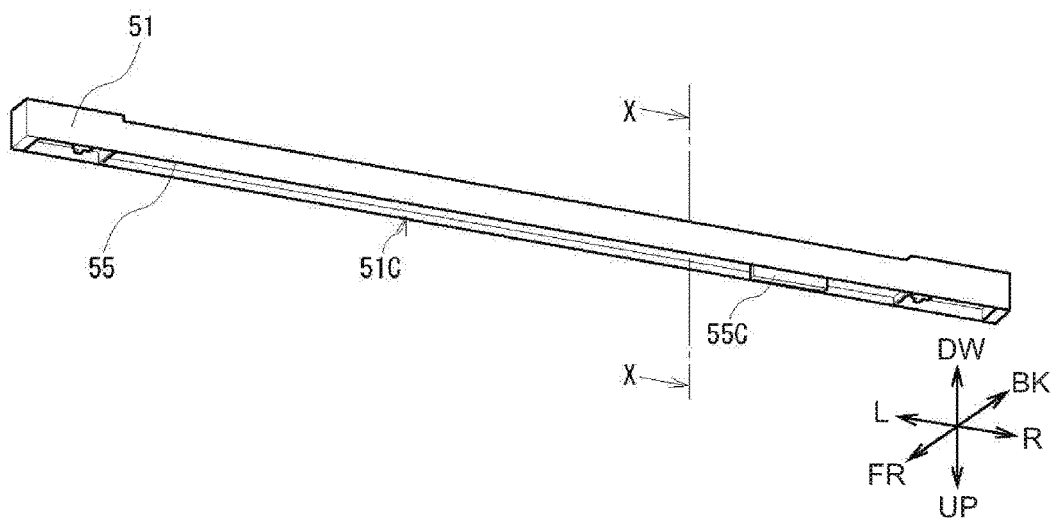
Figure 5:
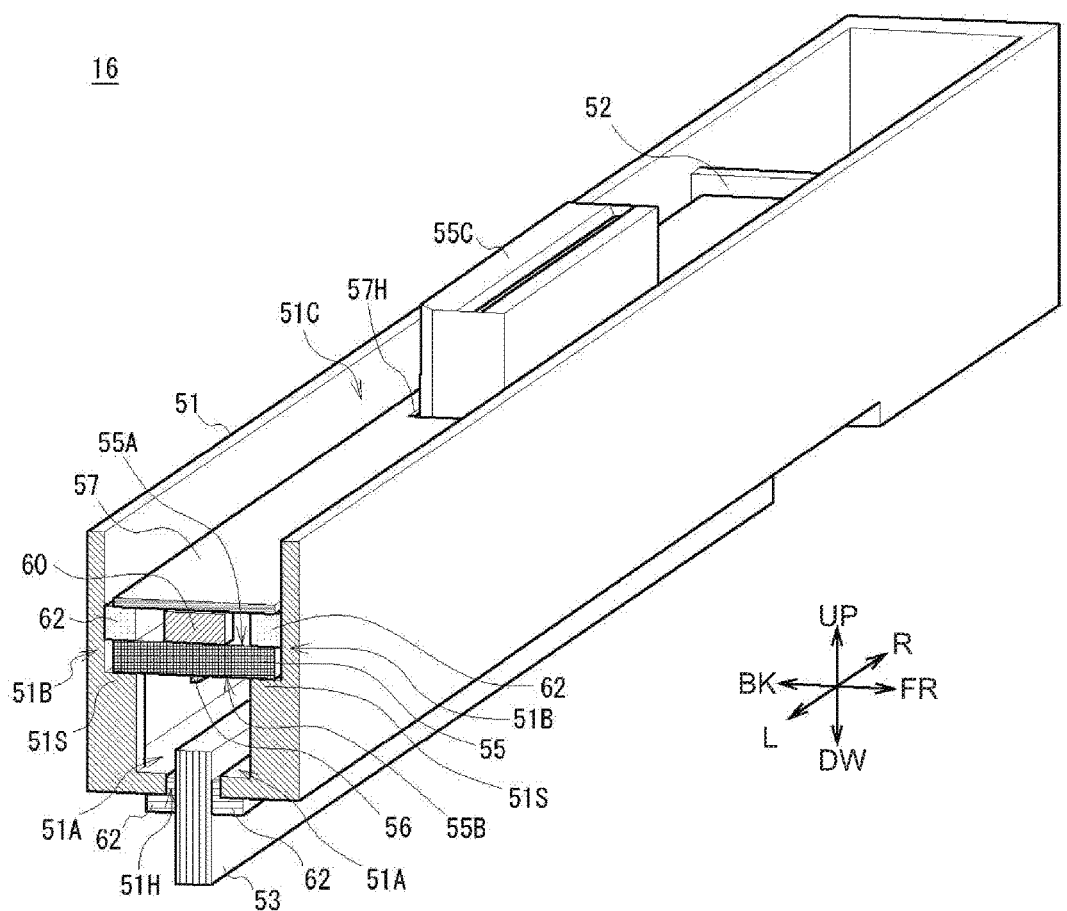
FIG. 5 is a cross-sectional view taken along the line X-X in FIG. 3B, which illustrates an LED head configuration (2) according to the first embodiment.
Figure 8:
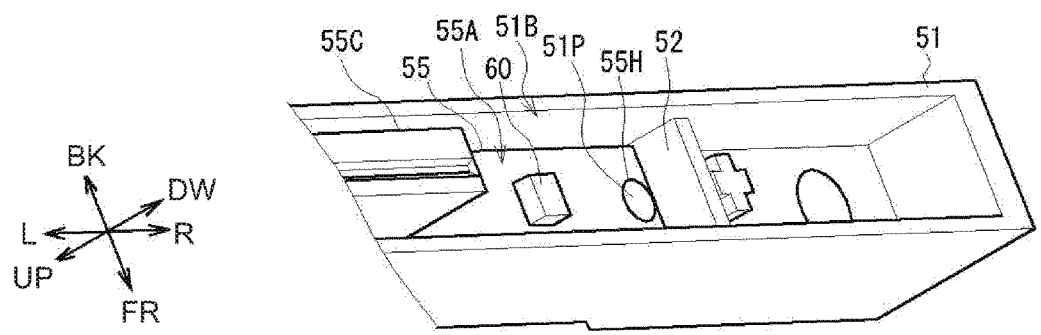
FIG. 8 is a perspective view illustrating an LED head manufacturing process (2) according to the first embodiment.

Next, a configuration of the LED head 16 is described. As illustrated in FIGS. 3 and 5, the entirety of the LED head 16 is formed in a cuboid shape that is elongated in the right-left direction, and various parts thereof are attached to a holder 51. Incidentally, FIG. 3A illustrates a perspective view of the LED head 16 as seen from a lower front side, FIG. 3B illustrates a perspective view of the LED head 16 as seen from an upper front side, FIG. 5 illustrates a cross-sectional view taken along the line X-X in FIG. 3B, and FIG. 8 illustrates an enlarged perspective view of the LED head 16 during manufacturing as seen from the upper front side. The LED head 16 mainly includes the holder 51, a board 55, and a rod lens array 53.

The holder 51 is made by, for example, metal molding a liquid crystal polymer. The holder 51 includes a plate-like base portion 51A that is elongated in the right-left direction and thin in the up-down direction as a center thereof. Plate-like side portions 51B that are elongated in the right-left direction and thin in the front-back direction are provided respectively from both front and back sides of the bottom portion 51A to extend upward, and a holder opening 51C is provided, being opened in an upper end of the holder 51. Near the center in the front-back direction of the bottom portion 51A, a hole 51H like a slit elongated in the right-left direction is drilled in such a way as to penetrate through the bottom portion 51A in the up-down direction. In each of the side portions 51B, an abutment portion 51S is formed as a protrusion. Further, on both right and left sides of the hole 51H in an upper surface of the bottom portion 51A, plates 52 are respectively provided standing upward. From the two ends in the right-left direction of the holder 51, pins 51P are projectingly provided in such a way as to respectively fit into fitting holes 55H of the board 55 illustrated in FIGS. 4 and 8.

The rod lens array 53 as a converging lens is inserted into and attached to the hole 51H. The rod lens array 53 is thus supported by the holder 51. The entirety of the rod lens array 53 is formed in a cuboid shape that is elongated in the right-left direction, and the rod lens array 53 holds a large number of tiny lenses aligned along the right-left direction. These lenses have an optical property for converging light emitted from a later-described LED array 56. The rod lens array 53 is fixedly bonded to the holder 51 such that a light incident distance between an upper surface of the rod lens array 53 that is a light receiving end surface thereof and a lower surface of the LED array 56 that is a front surface thereof has a value that optimizes the properties of the rod lens array 53.

In gaps between the bottom portion 51A of the holder 51 and the rod lens array 53, silicone resin 62 as a sealing material is filled to fill up these gaps. Thus, in the LED head 16, the gaps between the holder 51 and the rod lens array 53 are sealed, and a space surrounded by the bottom portion 51A of the holder 51, the front and back side portions 51B and a lower surface of the board 55 is substantially tightly closed. This prevents light and an extraneous material from entering this space.

Figure 7:
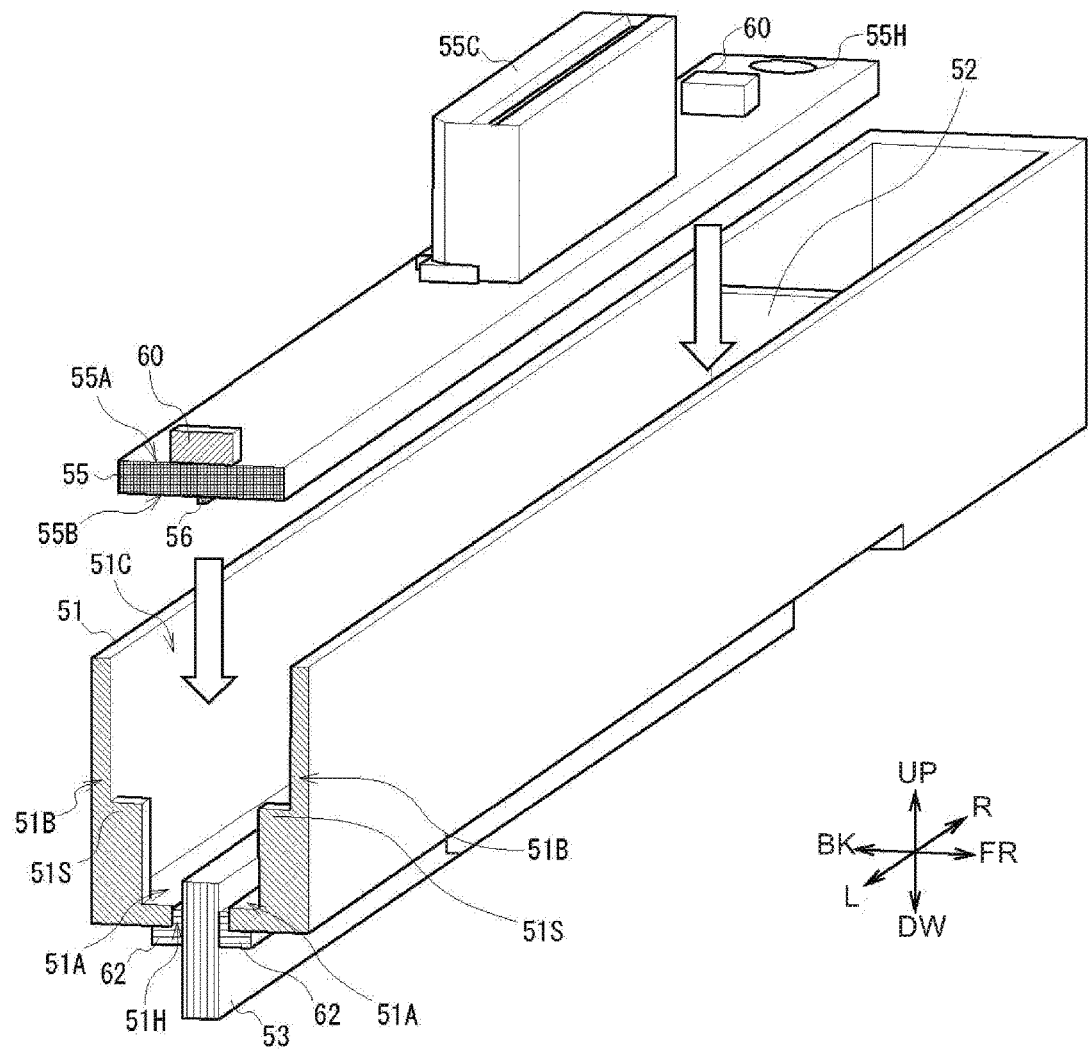
FIG. 7 is a perspective cross-sectional view illustrating an LED head manufacturing process (1) according to the first embodiment.

On the side portions 51B of the holder 51, the abutment portions 51S illustrated in FIGS. 5 and 7 are formed such that their positions in the right-left direction are aligned with the positions in the right-left direction of later-described electronic parts 60 (FIGS. 4, 7, and 8) on the board 55. Each abutment portion 51S includes a plane abutment surface, which has a length in the right-left direction that is longer than a length in the right-left direction of the corresponding electronic part 60, formed on the upper surface thereof along the front-back and right-left directions. In this way, even if an error such as misalignment of the positions in the right-left direction of the electronic part 60 and the abutment portion 51S is occurred, the abutment portion 51S can be surely located beneath the electronic part 60. While the abutment surfaces respectively formed in front and back of one electronic part 60 are considered to be a pair, four abutment portions 51S are arranged in the right-left direction with regular intervals in the right-left direction that are similar to the intervals between the electronic parts 60. This abutment portion 51S has high flatness with respect to the horizontal direction such that a spacing in the up-down direction between the LED array 56 and the rod lens array 53 is fixed.

Figure 4A:
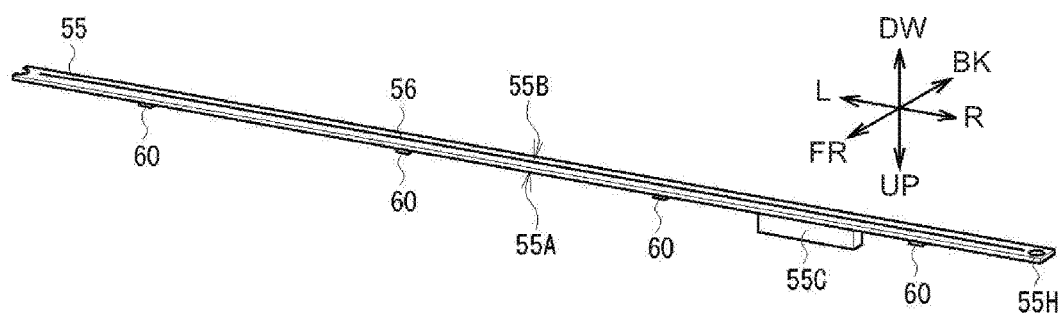
FIGS. 4A and 4B are perspective views illustrating a configuration of a board.
Figure 4B:
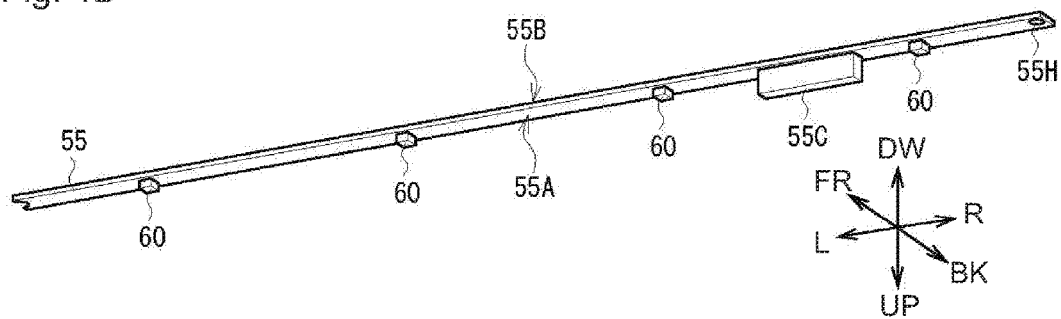

In the holder 51, the board 55 illustrated in FIGS. 4 and 7 is attached above the rod lens array 53 in a way to be abutted on the abutment portions 51S while the longitudinal direction thereof is along the right-left direction. Incidentally, FIG. 4A illustrates a perspective view of the board 55 as seen from a lower front side, and FIG. 4B illustrates a perspective view of the board 55 as seen from an upper back side. The board 55 is made of a so-called glass epoxy board. The board 55 is formed like a plate that is elongated in the right-left direction and thin in the up-down direction, and includes wiring layers on which a predetermined wiring pattern is formed being layered in the up-down direction. This board 55 has a length in the front-back direction that is shorter than the spacing between the side portions 51B of the holder 51 and a length in the right-left direction that is shorter than the spacing between the plates 52 of the holder 51. Specifically, the board 55 has the length in the right-left direction (the longitudinal direction) of 224.6 mm and the thickness in the up-down direction of 1 mm.

Near the center in the front-back direction of an LED array arrangement surface 55B that is the lower surface of the board 55, the LED array 56 is mounted along the longitudinal direction of the board 55 while facing the rod lens array 53. On this LED array 56, light emission points that emit light downward are arranged along the right-left direction with predetermined tiny intervals.

Figure 11:
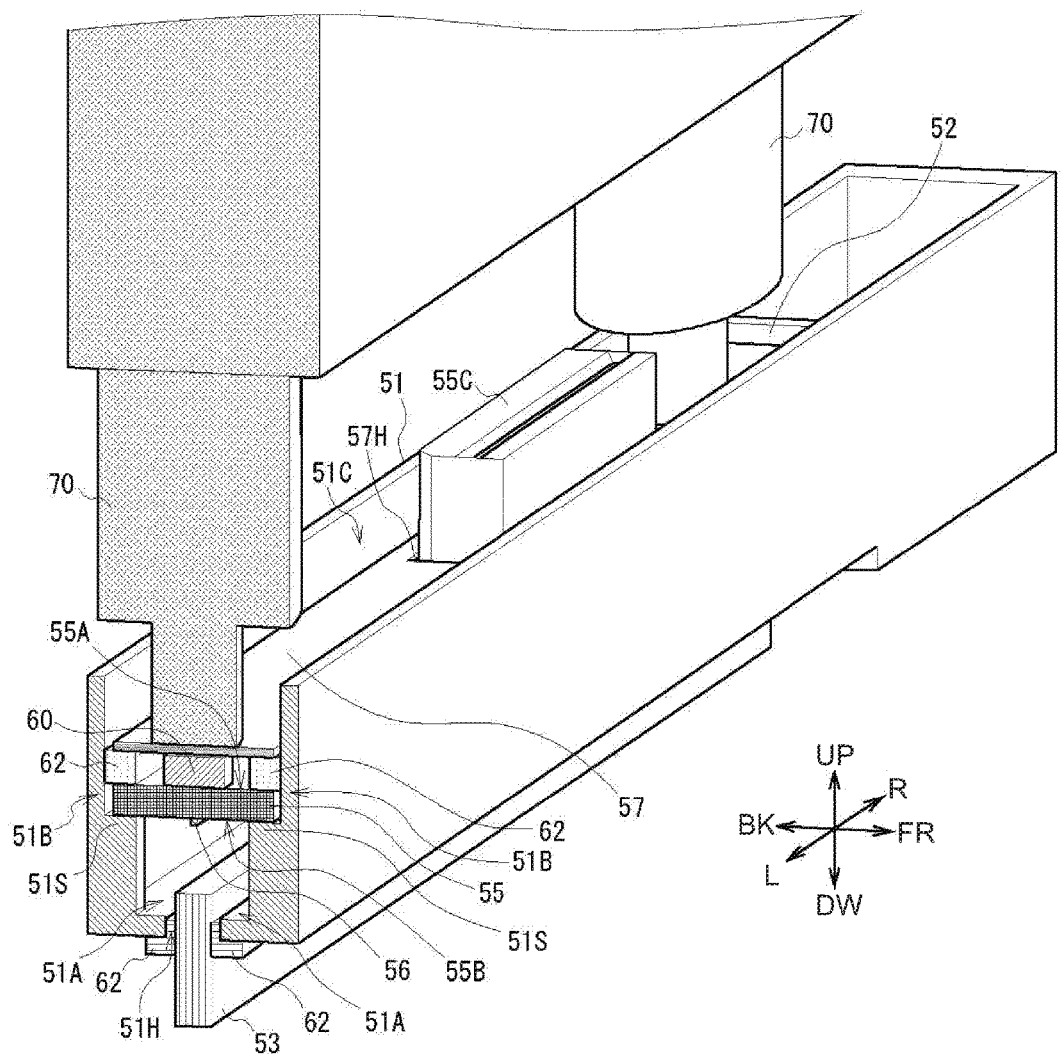
FIG. 11 is a perspective cross-sectional view illustrating an LED head manufacturing process (5) according to the first embodiment.

The electronic part arrangement surface 55A that is an upper surface of the board 55 is equipped with the electronic parts 60 all having the same shape. In practice, various electronic parts (not illustrated) for driving the LED head 16 other than the electronic parts 60 are mounted on the electronic part arrangement surface 55A. The electronic parts 60 are chip condensers, for example. Four electronic parts 60 are arranged side-by-side with regular intervals in the right-left direction that is the longitudinal direction of the board 55, and positions of the electronic parts 60 are aligned in the front-back direction that is the widthwise direction (the transverse direction) of the board 55, while each electronic part 60 is arranged near the center of the front-back direction. Specifically, the four electronic parts 60 are arranged with intervals of 66 mm in the right-left direction. Each interval between the electronic parts 60 is 20% or more and 50% or less of the length in the longitudinal direction of the board 55. In other words, specifically, the electronic parts 60 are arranged with intervals between about 45 mm and about 112 mm inclusive with respect to the board 55 having the length in the longitudinal direction of 224.6 mm. The positions in the right-left direction of the electronic parts 60 are aligned with the positions in the right-left direction of the abutment portions 51S of the holder 51; that is, each electronic part 60 is arranged in the position that is sandwiched between the pair of front and back abutment portions 51S in the front-back direction. Since the height of these electronic parts 60 is formed higher than that of the other electronic parts (not illustrated) equipped on the electronic part arrangement surface 55A of the board 55, it is easy to press the electronic parts 60 by using a later-described jig 70 (FIG. 11).

In a vicinity of a right end of the electronic part arrangement surface 55A of the board 55, that is, specifically, between the electronic part 60 on the right end and the electronic part 60 second from the right, a connecter 55C for connecting a cable that makes conduction of the various electronic parts of the board 55 and the controller 3 and the like of the color printer 1 is mounted. This means that, on the board 55, one electronic part 60 is arranged on a right side that is outer in the right-left direction than the right side of the board 55 on which the connector 55C is arranged.

In this way, in the color printer 1, the electronic parts 60 and the like are mounted on the electronic part arrangement surface 55A of the board 55, and the LED array 56 is mounted on the LED array arrangement surface 55B that is a back surface of the electronic part arrangement surface 55A. In other words, the electronic parts 60 and the LED array 56 are mounted on the different surfaces of the board 55. With this, in the color printer 1, the board 55 and the LED head 16 can be downsized and accordingly the cost can be reduced.

In two ends in the right-left direction of the board 55, the fitting holes 55H into which the pins 51P of the holder 51 are fit are drilled. The LED head 16 regulates the position in the right-left and front-back directions of the board 55 in the holder 51 by fitting the pins 51P of the holder 51 into the fitting holes 55H of the board 55 as illustrated in FIG. 8.

As illustrated in FIG. 5, in the gaps between the side portions 51B of the holder 51 and the board 55, the silicone resin 62 as a sealing material is filled to fill up these gaps. Thus, in the LED head 16, the gaps between the holder 51 and the board 55 are sealed, and a space surrounded by the bottom portion 51A of the holder 51, the front and back side portions 51B and the lower surface of the board 55 is substantially tightly closed. This prevents an extraneous material from entering this space. In addition to sealing of the gaps, the silicone resin 62 acts as adhesive to bond the board 55, the holder 51, and a later-described insulation sheet 57 to each other.

Since the entire surface of the electronic part arrangement surface 55A is covered with the insulation sheet 57, the board 55 is prevented from being exposed outside. The insulation sheet 57 is made of a polyester material having an insulation property such as Mylar (registered trademark) sheet. The insulation sheet 57 is formed like a film that is long in the right-left direction, thin in the up-down direction, and having the length in the front-back direction (i.e., width) narrower than that of the board 55. In the insulation sheet 57, a sheet hole 57H is formed by cutting out the insulation sheet 57 along the profile shape of the connector 55C so as to completely expose the connector 55C and the like. The insulation sheet 57 is covers the electronic part arrangement surface 55A of the board 55, that is, a surface opposite to the LED array arrangement surface 55B equipped with the LED array 56, while the both front and back ends of the insulation sheet 57 are slightly spaced in the front-back direction from the both front and back ends of the board 55.

Hence, in the LED head 16, the board 55 is fixed to the holder 51 while the insulation sheet 57 covers the appropriate position on the upper surface of the board 55.

[1-4. Manufacturing of LED Head]

Figure 6:
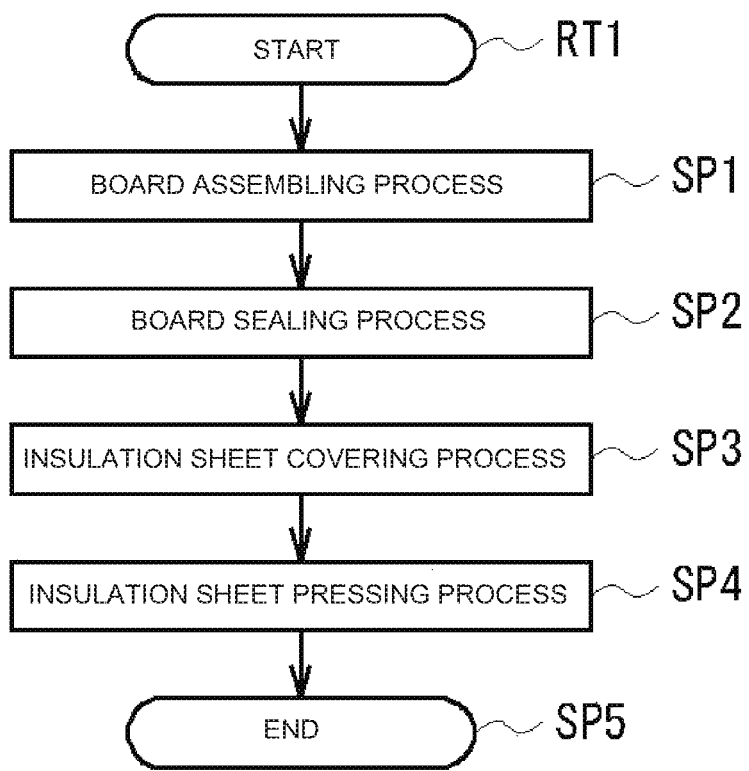
FIG. 6 is a flowchart illustrating an LED head manufacturing processing procedure according to the first embodiment.

Next, manufacturing processes of the LED head 16 are described. The LED head 16 is manufactured according to an LED head manufacturing processing procedure RT1 illustrated in FIG. 6. In this LED head manufacturing processing procedure RT1, in the holder 51, the rod lens array 53 is fixedly bonded to the optimal position in the up-down direction with respect to the abutment portions 51S. The LED array 56 and the electronic parts 60 are mounted on the different surfaces of the board 55, and the electronic parts 60 are mounted with regular intervals along the right-left direction while their positions in the right-left direction are aligned with the positions in the right-left direction of the abutment portions 51S of the holder 51.

In the LED head manufacturing processing procedure RT1, in step SP1, as illustrated in FIG. 7, the board 55 is fitted into the abutment portions 51S of the holder 51 such that the rod lens array 53 and the LED array 56 face to each other in the up-down direction. At this time, as illustrated in FIG. 8, the position in the front-back and right-left directions of the board 55 in the holder 51 is regulated by fitting the pins 51P of the holder 51 into the fitting holes 55H of the board 55.

Figure 9:
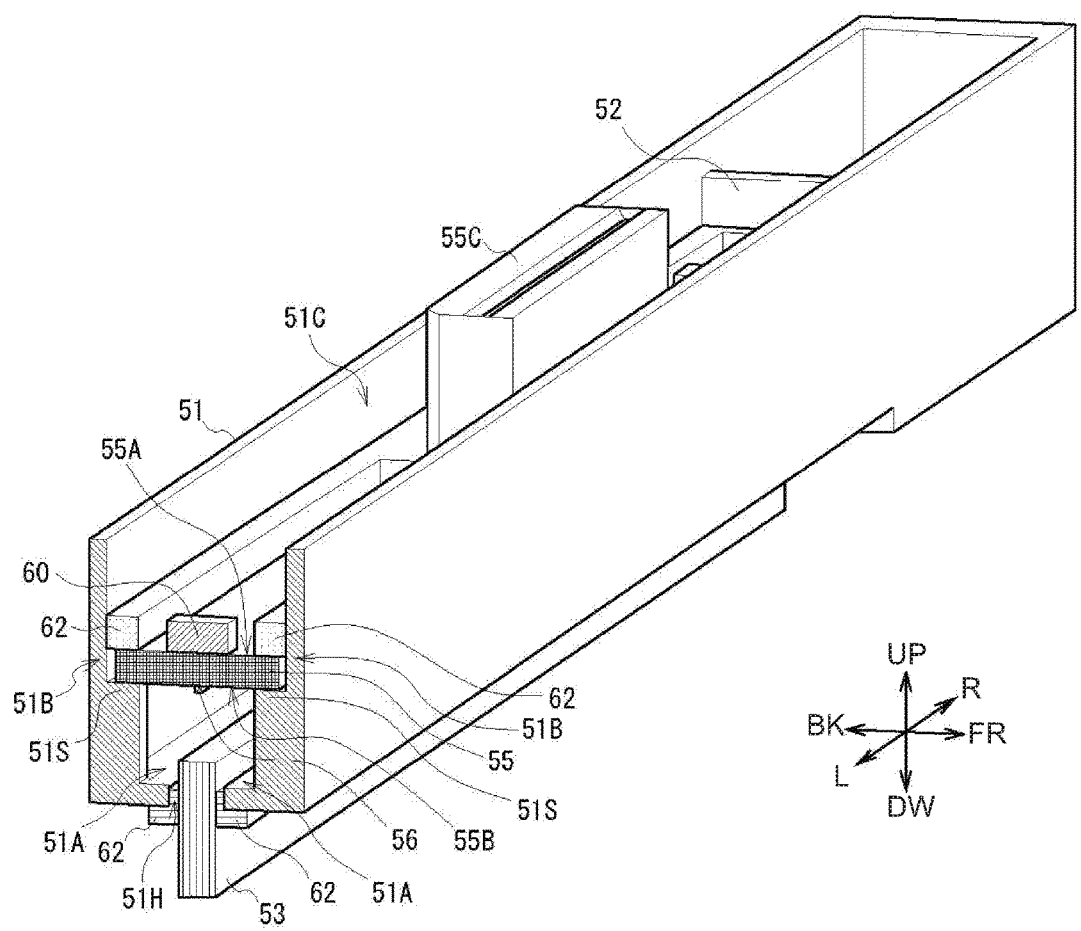
FIG. 9 is a perspective cross-sectional view illustrating an LED head manufacturing process (3) according to the first embodiment.

Next, in the LED head manufacturing processing procedure RT1, in a subsequent step SP2, as illustrated in FIG. 9, the gaps between the board 55 and the holder 51 is sealed with the silicone resin 62 so as to be occluded. At this time, the periphery of the connector 55C is also sealed with the silicone resin 62 such that the gap between the connector 55C and the board 55 is occluded.

Figure 10:
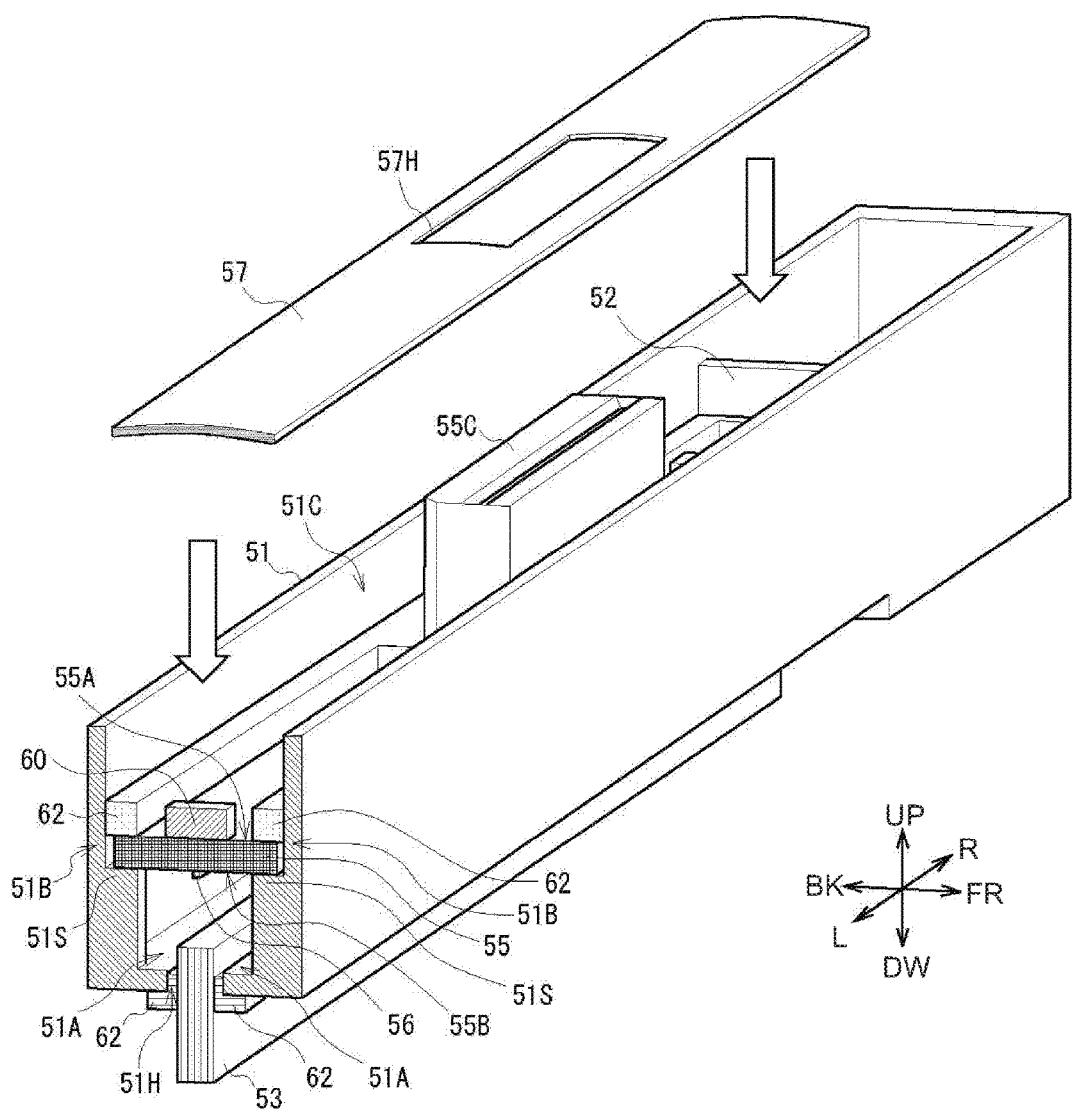
FIG. 10 is a perspective cross-sectional view illustrating an LED head manufacturing process (4) according to the first embodiment.

Next, in the LED head manufacturing processing procedure RT1, in a subsequent step SP3, as illustrated in FIG. 10, the insulation sheet 57 in which the sheet hole 57H is formed covers the silicone resin 62. At this time, since a direction of the grain of the insulation sheet 57 is made in the front-back direction, and thus the insulation sheet 57 is curved in the front-back direction (i.e., the ends in the front-back direction are located lower than the center), the silicone resin 62 and the insulation sheet 57 are tightly bonded to each other easily.

Next, in the LED head manufacturing processing procedure RT1, in a subsequent step SP4, as illustrated in FIG. 11, the electronic parts 60, which are mounted in the positions in the right-left direction that are the same as the positions in the right-left direction of the abutment portions 51S of the holder 51, are pressed downward by using the jig 70 with the insulation sheet 57 interposed in between, and are kept in the state where the board 55 is abutted on the abutment portions 51S of the holder 51 until the silicone resin 62 is cured. Then, the procedure proceeds to step SP5. In the jig 70, a surface facing each electronic part 60 is formed parallel to the upper surface of the electronic part 60. At this time, the curing time of the silicone resin 62 may be shortened by heating or moistening.

Hence, in the LED head 16, after the board 55 is abutted on the abutment portions 51S of the holder 51, the gaps between the board 55 and the holder 51 are sealed with the silicone resin 62, and the electronic parts 60 are pressed by using the jig 70 with the insulation sheet 57 interposed in between until the silicone resin 62 is cured in order to fix the board 55 to the holder 51.

[1-5. Operation and Effect]

In the LED head 16 with the above configuration, the board 55 is fit into the holder 51, the gaps between the board 55 and the holder 51 are sealed with the silicone resin 62, the board 55 is covered with the insulation sheet 57, and the insulation sheet 57 is pressed by the jig 70 at the position above the electronic parts 60. Thus, in the LED head 16, the silicone resin 62 is cured while the board 55 is pressed and biased against the abutment portions 51S of the holder 51, and the board 55 is bonded to and fixed to the holder 51 by using the silicone resin 62 while the electronic parts 60 and the insulation sheet 57 abut on each other.

With this, the LED head 16 can fix the board 55 on the holder 51 without additionally using a base. Hence, comparing the LED head 16 with the conventional LED head, the base can be removed and accordingly the configuration of the LED head 16 can be simplified, and thus cost of the members for the LED head 16 can be reduced.

If the base is removed from the conventional LED head, the board 55 is unable to be biased against the holder 51. Thus, in order to abut the board 55 that is curved in the up-down direction on the abutment portions 51S from one end to the other end in the right-left direction of the board 55, the board 55 needs to be pressed against the holder 51 by using the jig 70 until the silicone resin 62 acting as adhesive is cured and the board 55 is bonded to the holder 51.

However, when the insulation sheet 57 located above the electronic part arrangement surface 55A of the board 55 at a height of the electronic parts 60 in the up-down direction is pressed against the board 55 by using the jig 70 from above a position below which no electronic part 60 is provided, the insulation sheet 57 may be crushed. With this, the silicone resin 62 not cured yet may be pushed out from the gaps between the insulation sheet 57 and the holder 51 and thus the board 55 may be exposed, and the silicone resin 62 not cured yet may be moved to surround the LED array arrangement surface 55B of the board 55. Hence, sealing failure of the silicone resin 62 may be occurred. Exposure of the board 55 may cause a failure of the board 55 due to immixture of a tiny extraneous material into the LED array arrangement surface 55B or static electricity discharge occurred when a charged human hand comes closer.

In view of this, in this embodiment, the portions of the board 55 that are pressed by using the jig 70 with the insulation sheet 57 interposed in between are portions on which the electronic parts 60 are mounted, instead of the surface of the electronic part arrangement surface 55A. With this, in the LED head 16, the spacing between the insulation sheet 57 and the electronic part arrangement surface 55A is fixedly maintained, and thus the insulation sheet 57 is prevented from being crushed when the board 55 is pressed by using the jig 70. Hence, sealing failure of the silicone resin 62 can be prevented.

In this respect, if the positions in the right-left direction of the electronic parts 60 and the positions in the right-left direction of the abutment portions 51S are different from each other, abutment portions 51S as receiving portions for receiving the pressing force from the jig 70 do not exist in vicinities of the electronic parts 60, and thus the portion of the board 55 pressed by using the jig 70 is bend. In this case, the board 55 is curved along the longitudinal direction in the up-down direction.

In view of this, in the LED head 16, the positions in the right-left direction of the abutment portions 51S of the holder 51 and the positions in the right-left direction of the electronic parts 60 mounted on the board 55 that is fitted into the holder 51 are matched. Thus, in the LED head 16, the force from the jig 70 to press the electronic parts 60 by using the jig 70 can be received by the abutment portions 51S provided in the vicinities of the electronic parts 60, and the portion of the board 55 that is pressed by using the jig 70 can be prevented from being bend. As a result, in the LED head 16, the board 55 can be prevented from being curved along the longitudinal direction in the up-down direction and can be fixed to the holder 51 while correcting the curve in the up-down direction of the board 55.

Thus, in the LED head 16, the curve in the up-down direction of the board 55 can be corrected with no sealing failure of the silicone resin 62, and the board 55 can be fixed to the holder 51 without using the base.

Essentially, in the holder 51, it is desirable that the abutment portions 51S as the receiving portions for receiving the pressing force from the jig 70 are formed directly under the electric portions 60, which are the positions being pressed by the jig 70. However, since the LED array 56 is located directly under the electronic parts 60, the front and back positions of the abutment portions 51S cannot match that of the electronic parts 60. Thus, when two ends in the front-back direction of the board 55 are pressed against the abutment portions 51S by pressing the electronic parts 60 provided on the center in the front-back direction of the board 55 by using the jig 70, a slight curve in the up-down direction with a center axis along the right-left direction may be occurred in the board 55. However, since the width in the front-back direction of the board 55 (i.e. the width direction) is narrow, only a slight curve that can be ignored in practice is occurred.

Here, for example, the number of the portions pressed by using the jig 70, that is, each number of the electronic parts 60 and the abutment portions 51S is four, which is enough number for correcting the curve in the up-down direction of the board 55 to keep the quality of an LED image created by the LED head 16 even when the board 55 is curved in the up-down direction.

Specifically, in the LED head 16, assuming that the board 55 having the length in the longitudinal direction of 224.6 mm and the thickness in the up-down direction of 1 mm is curved in the up-down direction by about 1 mm, four portions for being pressed against the holder 51 are formed on the board 55 with regular intervals of 66 mm in the right-left direction. At least two intervals in the right-left direction between the pressed portions are provided, each having a length of at least 20% or more and 50% or less of the length of the board 55.

In the LED head 16, since the electronic parts 60 having the same shape are mounted with regular intervals in the right-left direction on the board 55, the portions of the board 55 that are pressed against the abutment portions 51S by using the jig 70 are provided with regular intervals along the longitudinal direction of the board 55. Thus, in the LED head 16, the board 55 can be bonded to the holder 51 while evenly correcting the curve in the up-down direction along the longitudinal direction of the board 55.

On the board 55, the curve in the up-down direction is likely to be occurred in a vicinity of the position in which the connector 55C is mounted. This is because the mounted connector 55C is expanded due to the heat applied in a soldering process of the connector 55C, and thus its internal stress is different from the stress in other positions. Further, since the physical properties of the board 55 and the connector 55C are different, the expansion rates of the board 55 and the connector 55C when the silicone resin 62 is heated or moistened to cure it are different. Thus, on the board 55, when the silicone resin 62 is cured, the curve is likely to be occurred in the vicinity of the position in which the connector 55C is mounted.

Hence, if the connector 55C is located on the end in the right-left direction of the board 55, and the positions pressed by using the jig 70 are located on only the inner side in the right-left direction of the connector 55C for example, the outer side in the right-left direction of the connector 55C on the board 55 may be largely curved in the up-down direction. Thus, at least one portion pressed by the jig 70 needs to be formed on the outer side in the right-left direction of the connector 55C (i.e., arranging the electronic parts 60), and the silicone resin 62 needs to be cured while the outer side in the right-left direction of the connector 55C is being pressed.

In view of this, in the LED head 16, one electronic part 60 is arranged on the right side of the board 55 that is the outer side in the right-left direction of the connector 55C arranged in the vicinity of the right end of the board 55. With this, in the LED head 16, the silicone resin 62 can be cured while pressing the right side of the connector 55C on the board 55, and thus the right side of the connector 55C on the board 55 ran be prevented from being curved in the up-down direction.

According to the above configuration, the LED head 16 of the color printer 1 is provided with the board 55 that has the LED array arrangement surface 55B as a first surface on which the LED array 56 as a light emitting element is arranged, the rod lens array 53 on which light from the LED head 16 is incident, the holder 51 that holds the rod lens array 53, and the insulation sheet 57 that is made of the insulation material. The board 55 has the electronic parts 60 as abutment parts that abut on the electronic part arrangement surface 55A as a second surface, which is the opposite surface of the LED array arrangement surface 55B, with the insulation sheet 57 interposed in between, and the insulation sheet 57 is fixed to the holder 51 while abutting on the electronic parts 60. Hence, in the LED head 16, because the electronic parts 60 are pressed on the board 55 with the insulation sheet 57 interposed in between and the board 55 is pressed against the holder 51 until the board 55 is bonded to the holder 51, the board 55 can be fixed to the holder 51 without additionally using the base.

2. Second Embodiment

[2-1. Configuration of Color Printer]

Figure 2:
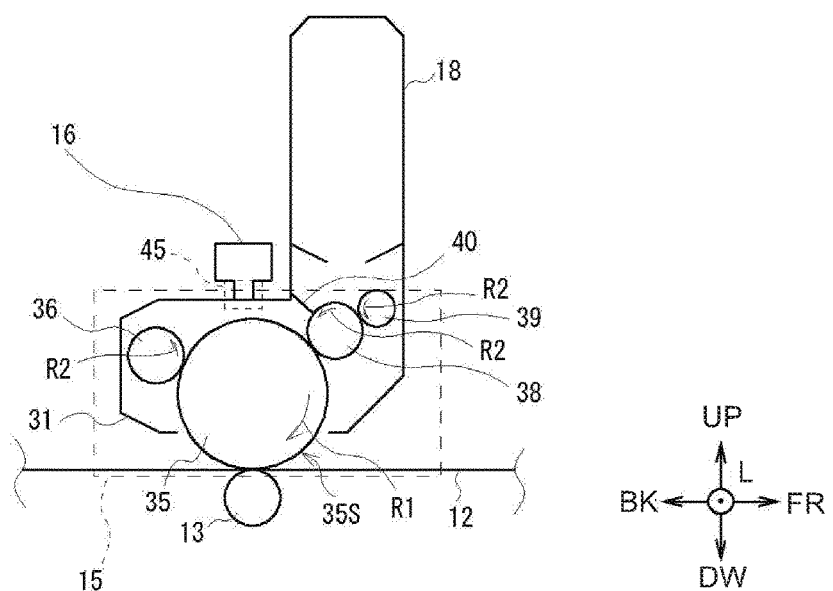
FIG. 2 is a left-side view illustrating a configuration of an image formation unit according to one or more embodiments.
Figure 12:
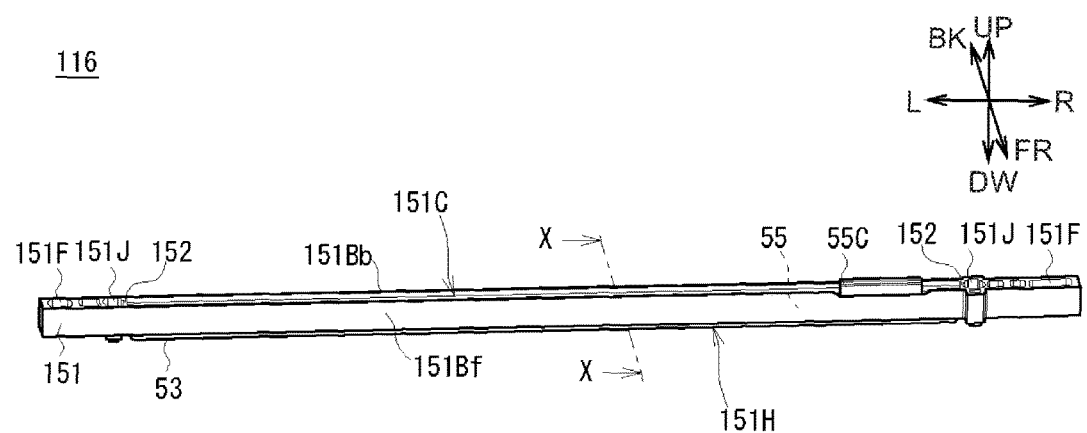
FIG. 12 is a perspective view illustrating an LED head configuration (1) according to a second embodiment.

A color printer 101 according to a second embodiment (FIG. 1) is different from the color printer 1 according to the first embodiment in having an LED head 116 (116C, 116M, 116Y, and 116K) illustrated in FIGS. 1 and 2 instead of the LED head 16 (16C, 16M, 16Y, and 16K); however, besides this difference, they have the same configuration. As illustrated in FIG. 12 in which the members corresponding to that in FIG. 3 are denoted by the same reference numerals and in FIG. 13 in which the members corresponding to that in FIG. 5 are denoted by the same reference numerals, the LED head 116 is different from the LED head 16 according to the first embodiment in having a holder 151 instead of the holder 51, an insulation sheet 157 instead of the insulation sheet 57, and a silicone resin 162 instead of the silicone resin 62; however, besides these differences, they have the same configuration.

[2-2. Configuration of LED Head]

Figure 13:
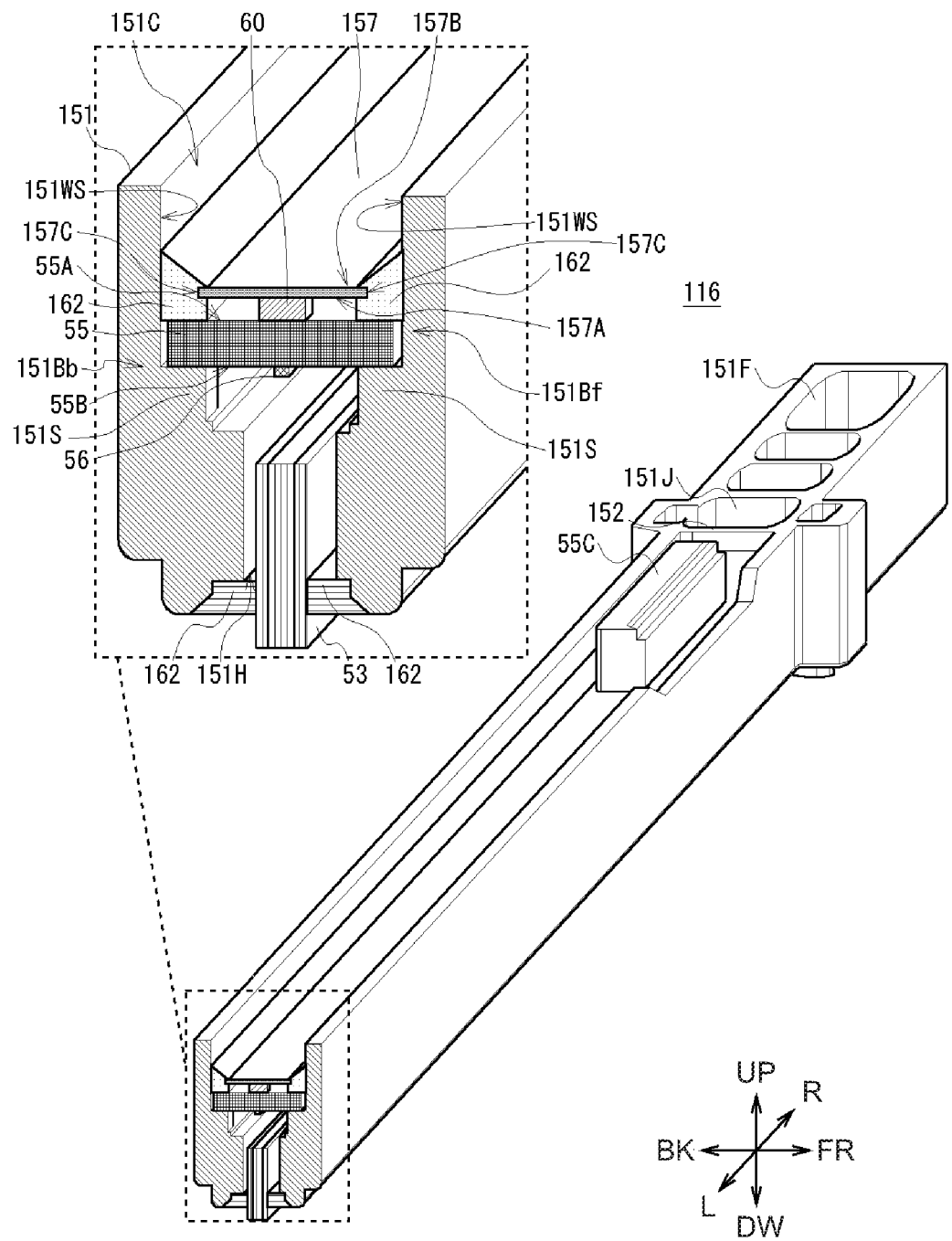
FIG. 13 is a cross-sectional view taken along the line X-X in FIG. 12, which illustrates an LED head configuration (2) according to the second embodiment.
Figure 18:
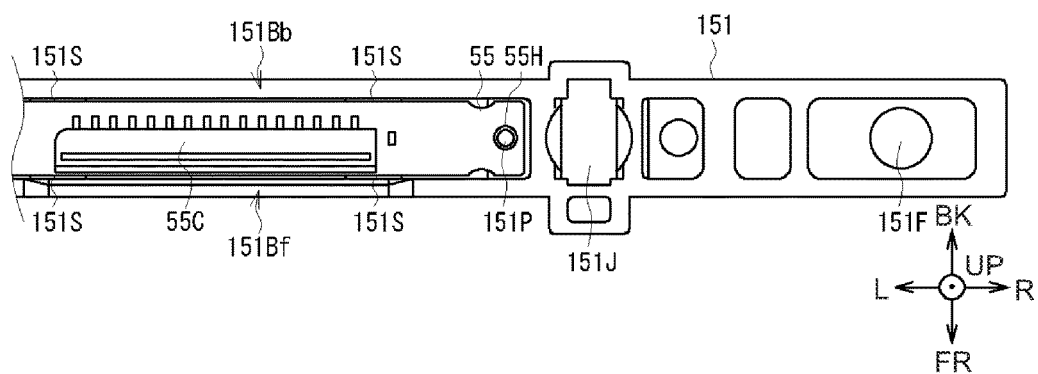
FIG. 18 is a plan view illustrating an LED head manufacturing process (2) according to the second embodiment.
Figure 19:
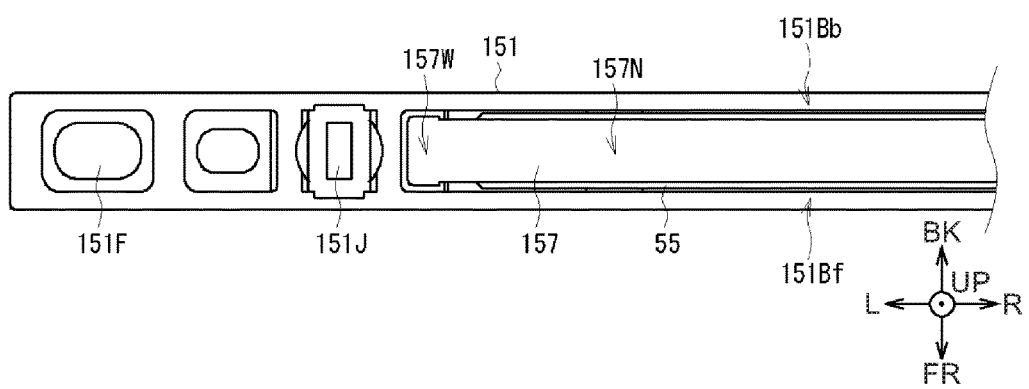
FIG. 19 is a plan view illustrating an LED head manufacturing process (3) according to the second embodiment.

As illustrated in FIGS. 12 and 13, the entirety of the LED head 116 is formed in a cuboid shape that is elongated in the right-left direction, and various parts thereof are attached to the holder 151. Incidentally, FIG. 12 illustrates a perspective view of the LED head 116 as seen from an upper front side, FIG. 13 illustrates a cross-sectional view taken along the line X-X in FIG. 12 and an enlarged cross-sectional view, FIG. 18 illustrates a plan view of a right end of the LED head 116 during manufacturing as seen from the above, and FIG. 19 illustrates a plan view of a left end of the LED head 116 during manufacturing as seen from the above. The LED head 116 mainly includes the holder 151, the board 55, and the rod lens array 53.

Figure 14A:
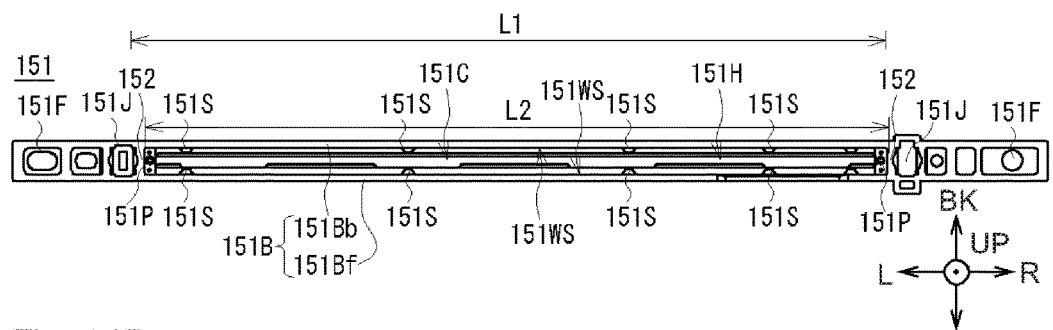
FIGS. 14A and 14B are views of a configuration of a holder according to the second embodiment.
Figure 14B:
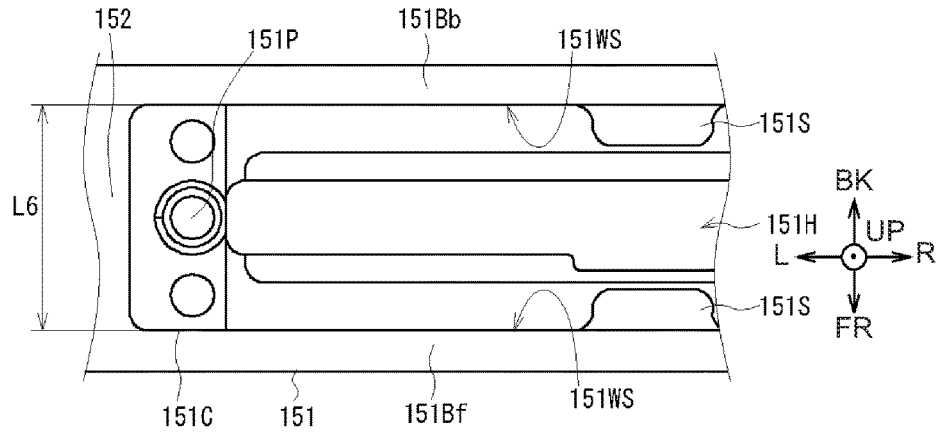

As illustrated in FIGS. 12, 13, and 14, the holder 151 is made by, for example, metallic molding a liquid crystal polymer. In the holder 151, plate-like side portion 151Bf and 151Bb that are elongated in the right-left direction and thin in the front-back direction are provided to be located respectively on the front side and the back side, and a holder opening 151C having a rectangular shape with rounded corners in a plan view is formed, being opened in an upper end of the holder 151. Hereinafter, the side portion 151Bf and the side portion 151Bb are also called a side portion 151B as a whole. On the side portion 151Bf and the side portion 151Bb, holder inner wall surfaces 151WS that are plane surfaces provided to extend in the front-back and up-down directions while facing each other are respectively formed from a portion facing the lower surface of the board 55 in the front-back direction to the inside of the upper end of the holder 151. As illustrated in FIG. 14B, in this embodiment, a holder widthwise direction inside dimension L6 that is a spacing between the holder inner wall surfaces 151WS is 5.6 mm.

Between a lower end of the side portion 151Bf and a lower end of the side portion 151Bb, a hole 151H like a slit elongated in the right-left direction is drilled in such a way as to penetrate through a bottom of the holder 151 in the up-down direction. Further, on both right and left sides of the hole 151H, plates 152 that are part of wall portions forming joint portions 151J are respectively provided standing upward. A space between a left wall surface of the right plate 152 and a right wall surface of the left plate 152 is for storing the board 55. As illustrated in FIG. 14A, in the holder 151, a spacing between the plates 152 is a holder opening longitudinal direction inside dimension L2.

In the holder 151, from portions between the plates 152 in the both right and left sides and the hole 151H, that is, two ends in the right-left direction of the inner side of the holder opening 151C, pins 151P are projectingly provided in such a way as to respectively fit into the fitting holes 55H of the board 55 illustrated in FIG. 4 for positioning of the board 55. In two ends in the right-left direction of the holder 151, fitting holes 151F for positioning of the holder 151 and the photoreceptor drum 35 (FIG. 2) are drilled. Further, between the pins 151P on the both right and left sides of the holder 151 and the fitting holes 151F, the joint portions 151J for mechanically connecting the LED head 116 into the color printer 101 with un-illustrated connection members are provided.

The rod lens array 53 illustrated in FIG. 13 is inserted into and attached to the hole 151H. The rod lens array 53 is thus supported by the holder 151. The rod lend array 53 is fixedly bonded to the holder 151 such that the light incidence distance between the upper surface of the rod lens array 53 that is the light receiving end surface and the lower surface of the LED array 56 that is the front surface thereof has a value that optimizes the properties of the rod lens array 53.

In gaps between the lower ends of the side portion 151B of the holder 151 and the rod lens array 53, the silicone resin 162 is filled to fill up these gaps. Thus, in the LED head 116, the gaps between the holder 51 and the rod lens array 53 are sealed, and a space surrounded by the front and back side portion 151B of the holder 151 and the lower surface of the board 55 is substantially tightly closed. This prevents light and an extraneous material from entering this space.

On the side portion 151B of the holder 151, abutment portions 151S illustrated in FIGS. 13 and 14 are formed such that their positions in the right-left direction are aligned with the positions in the right-left direction of the above-described electronic parts 60 (FIGS. 4 and 7). Each abutment portion 151S includes a plane abutment surface, which has a length in the right-left direction that is longer than a length in the right-left direction of the corresponding electronic part 60, formed on the upper surface thereof along the front-back and right-left directions. In this way, even if an error such as misalignment of the positions in the right-left direction of the electronic part 60 and the abutment portion 51S is occurred, the abutment portion 151S can be surely located beneath the electronic part 60. While the abutment surfaces respectively formed in front and back of one electronic part 60 are considered to be a pair, four abutment portions 151S are arranged in the right-left direction with regular intervals in the right-left direction that are similar to the intervals between the electronic parts 60. This abutment portion 151S has high flatness with respect to the horizontal direction such that a spacing in the up-down direction between the LED array 56 and the rod lens array 53 is fixed.

Figure 17:
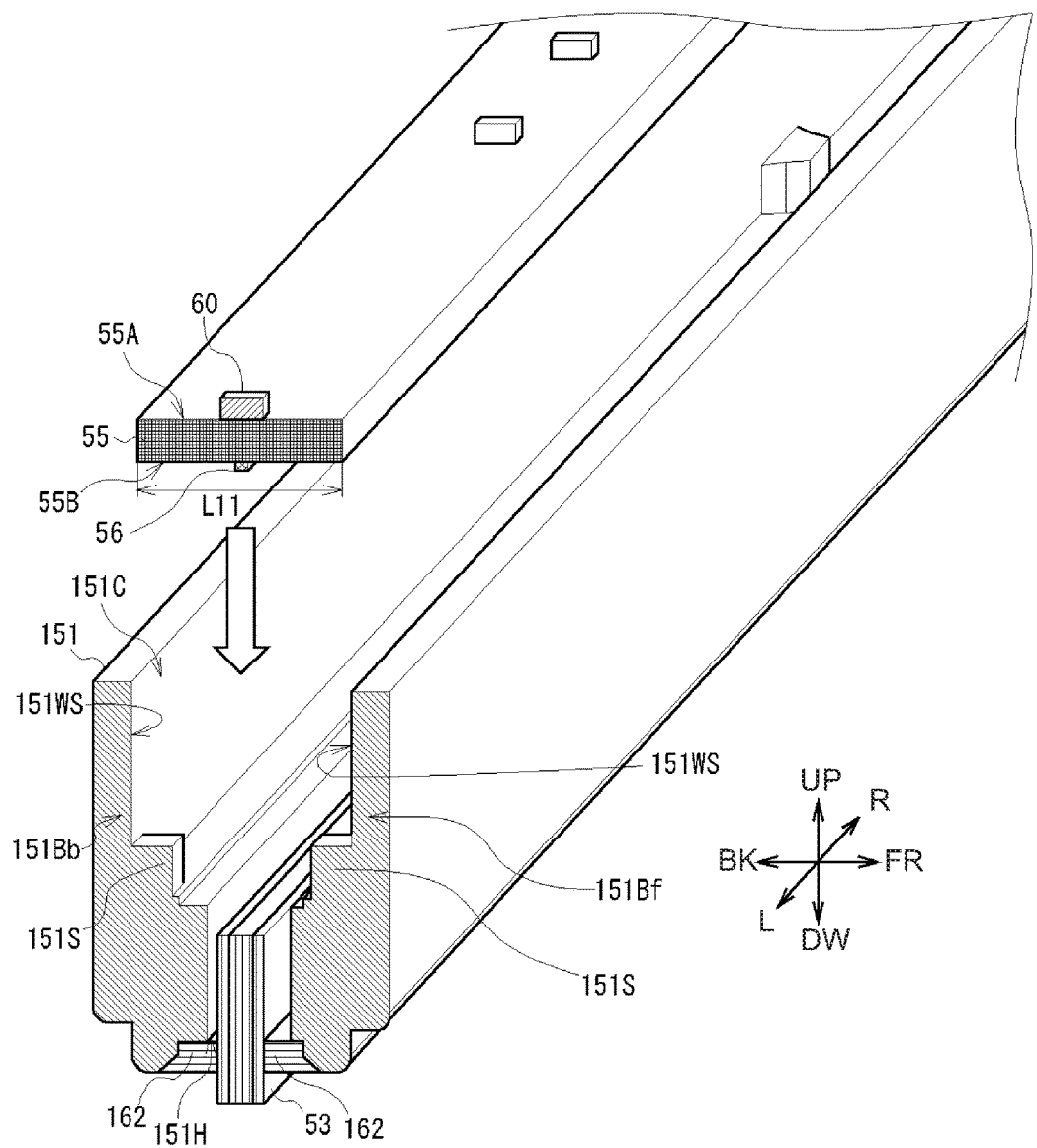
FIG. 17 is a perspective cross-sectional view illustrating an LED head manufacturing process (1) according to the second embodiment.

In the holder 151, the board 55 illustrated in FIG. 4 is attached above the rod lens array 53 in a way to be abutted on the abutment portions 151S while the longitudinal direction thereof is along the right-left direction. This board 55 has a length in the front-back direction that is shorter than the spacing between each of the side portion 151B of the holder 151 and a length in the right-left direction that is shorter than the spacing between the plates 152 of the holder 151. Specifically, the board 55 has a board length that is the length in the right-left direction (the longitudinal direction) of 224.6 mm, a board thickness that is the thickness in the up-down direction of 1 mm, and a board width L11 that is a width in the front-back direction (widthwise direction or transverse direction) as illustrated in FIG. 17 of 5.3 mm.

Near the center in the front-back direction of the LED array arrangement surface 55B that is the lower surface of the board 55, the LED array 56 is mounted along the longitudinal direction of the board 55 while facing the rod lens array 53. On this LED array 56, light emission points that emit light downward are arranged along the right-left direction with predetermined tiny intervals. In addition, the LED array 56 is arranged such that the two ends in the longitudinal direction are spaced by a predetermined distance from the two ends in the longitudinal direction of the board 55.

Figure 20:
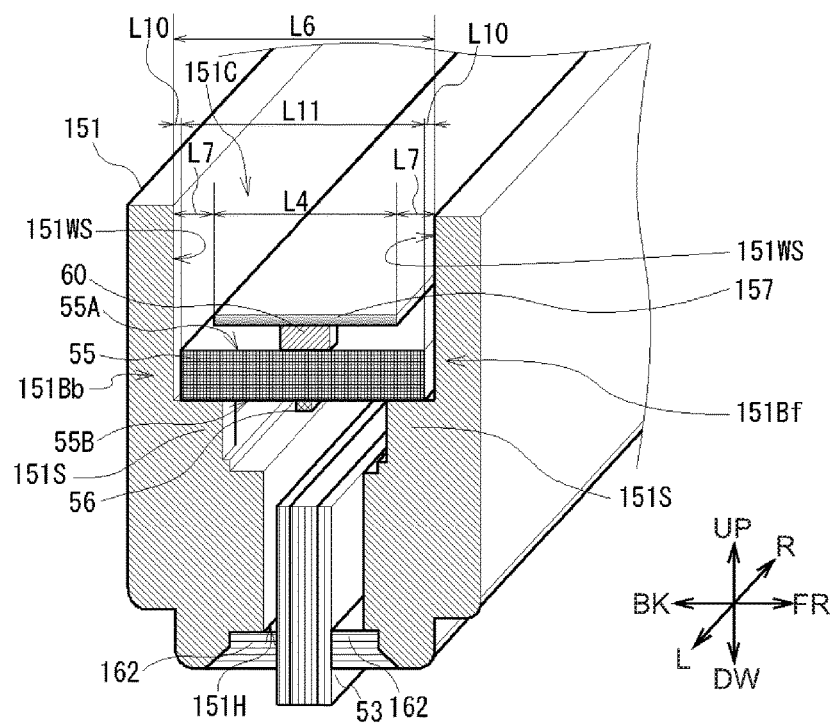
FIG. 20 is a perspective cross-sectional view illustrating an LED head manufacturing process (4) according to the second embodiment.

In the two ends in the right-left direction of the board 55, the fitting holes 55H (FIG. 8) into which the pins 151P of the holder 151 are fit are drilled. The LED head 116 regulates the position in the right-left and front-back of the board 55 in the holder 151 by fitting the pins 151P of the holder 151 into the fitting holes 55H of the board 55 as illustrated in FIG. 18. As illustrated in FIG. 20, gaps between the holder inner wall surfaces 151WS and the side surfaces in the front-back direction of the board 55 are inner wall surface board gaps L10.

As illustrated in FIG. 13, in the gaps between the side portion 151B of the holder 151 and the board 55, the silicone resin 162 is filled to fill up these gaps. Thus, in the LED head 16, the gaps between the holder 151 and the board 55 are sealed, and a space surrounded by the front and back side portion 151B of the holder 51 and the lower surface of the board 55 is substantially tightly closed. This prevents an extraneous material from entering this space. In addition to sealing of the gaps, the silicone resin 162 acts as adhesive to bond the board 55, the holder 151, and the later-described insulation sheet 157 to each other.

Figure 15A:
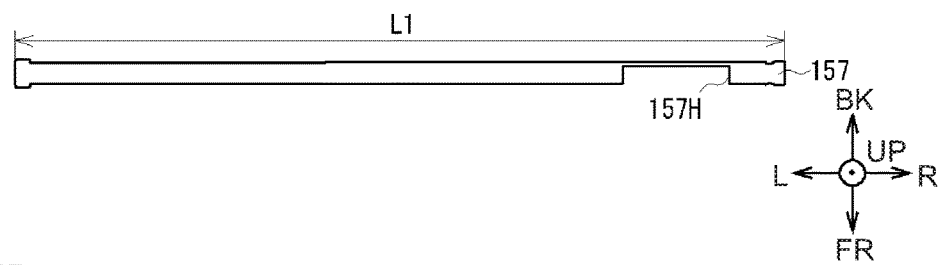
FIGS. 15A and 15B are views of a configuration of an insulation sheet according to the second embodiment.

Since the entire surface of the electronic part arrangement surface 55A is covered with the insulation sheet 157, the board 55 is prevented from being exposed outside. The insulation sheet 157 is made of a polyester material having an insulation property such as Mylar (registered trademark) sheet. The insulation sheet 157 is formed like a film that is long in the right-left direction, thin in the up-down direction, and having the length in the front-back direction (i.e., width) narrower than that of the board 55. In the insulation sheet 157, a sheet notch 157H illustrated in FIG. 15A is formed by cutting out the insulation sheet 157 along the profile shape of the connector 55C so as to completely expose the connector 55C and the like. The insulation sheet 157 covers the electronic part arrangement surface 55A of the board 55, that is, the surface opposite to the LED array arrangement surface 55B equipped with the LED array 56, while the both front and back ends of the insulation sheet 57 are slightly spaced in the front-back direction from the both front and back ends of the board 55.

Hence, in the LED head 116, the board 55 is fixed to the holder 151 while the insulation sheet 157 covers the appropriate position on the upper surface of the board 55.

As illustrated in FIG. 15A, an insulation sheet longitudinal direction length L1 that is a length in the longitudinal direction of the insulation sheet 157 is equal to or shorter than the holder opening longitudinal direction inside dimension L2 (FIG. 14A). In this embodiment, in consideration of dimension tolerance, the insulation sheet longitudinal direction length L1 is set as; the insulation sheet longitudinal direction length L1<the holder opening longitudinal direction inside dimension L2−0.5 mm, for example.

On the insulation sheet 157, wide width portions 157W are formed on two ends in the right-left direction (the longitudinal direction), and a narrow width portion 157N with a width in the front-back direction narrower than that of the wide width portions 157W are formed on the inner side in the right-left direction of the wide width portions 157W, respectively. A length of a sheet wide width portion right-left direction region L5 that is a region of the wide width portion 157W in the right-left direction (the longitudinal direction of the insulation sheet 157) is from two ends in the right-left direction of the holder opening 151C towards the inner side in the right-left direction of the insulation sheet 157 to a position quipped with the LED array 56, when the board 55 is mounted in the holder 151.

A width in the front-back direction of the wide width portion 157W is a sheet wide width portion width L3, and a width in the front-back direction of the narrow width portion 157N is a sheet narrow width portion width L4. It is desirable that the sheet wide width portion width L3 is the same as the holder widthwise direction inside dimension L6; however, in this embodiment, in consideration of dimension tolerance, the sheet wide width portion width L3 is set as; the sheet wide width portion width L3<the holder widthwise direction inside dimension L6−0.2 mm, for example. The sheet narrow width portion width L4 is set to be shorter than at least the board width L11 (FIG. 17), and its appropriate value is selected in accordance with an amount of the applied silicone resin 162. In this embodiment, the sheet wide width portion width L3 is 5.4 mm, and the sheet narrow width portion width L4 is 4.2 mm, respectively.

[2-3. Manufacturing of LED Head]

Figure 16:
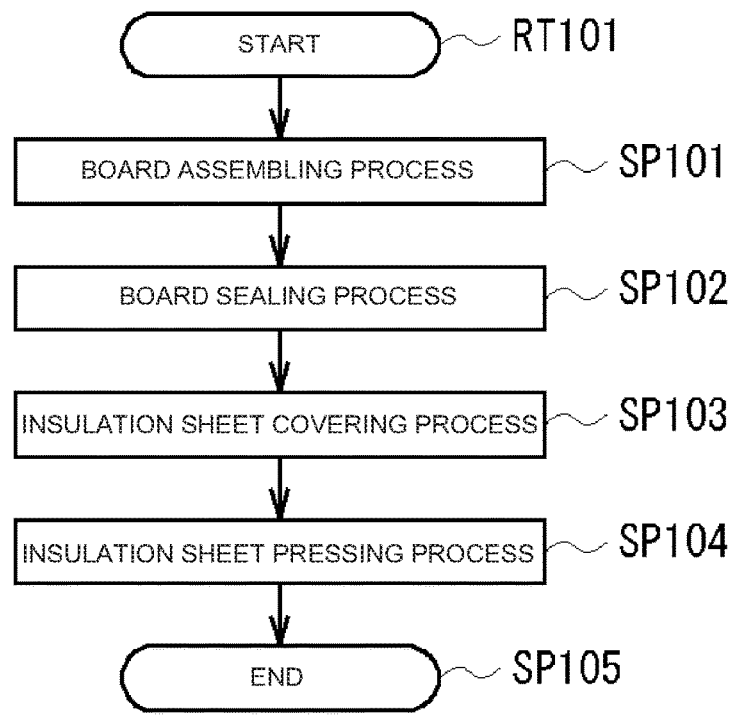
FIG. 16 is a flowchart illustrating an LED head manufacturing processing procedure according to the second embodiment.

Next, manufacturing processes of the LED head 116 are described. The LED head 116 is manufactured according to an LED head manufacturing processing procedure RT101 illustrated in FIG. 16. In this LED head manufacturing processing procedure RT101, in the holder 151, the rod lens array 53 is fixedly bonded to the optimal position in the up-down direction with respect to the abutment portions 151S. The LED array 56 and the electronic parts 60 are mounted on the different surfaces of the board 55, and the electronic parts 60 are mounted with regular intervals along the right-left direction while their positions in the right-left direction are aligned with the positions in the right-left direction of the abutment portions 151S of the holder 151.

In the LED head manufacturing processing procedure RT101, in step SP101, as illustrated in FIG. 17, the board 55 is fitted into the abutment portions 151S of the holder 51 such that the rod lens array 53 and the LED array 56 face to each other in the up-down direction. At this time, as illustrated in FIG. 18, the position in the front-back and right-left directions of the board 55 in the holder 151 is regulated by fitting the pins 151P of the holder 151 into the fitting holes 55H of the board 55.

Figure 15B:
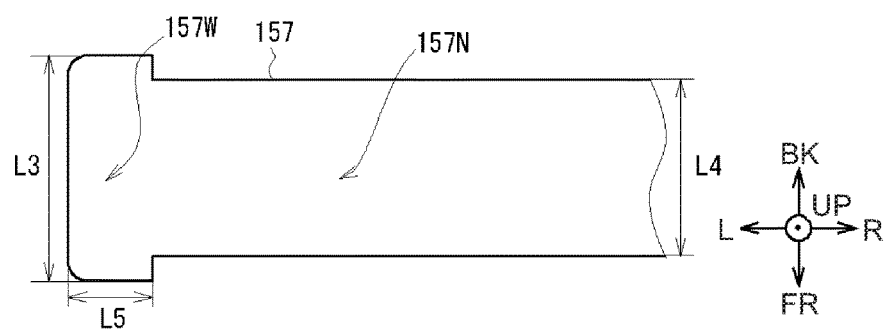

Next, in the LED head manufacturing processing procedure RT101, in a subsequent step SP102, as illustrated in FIGS. 19 and 20, the insulation sheet 157 in which the sheet notch 157H (FIG. 15) is formed covers the board 55. At this time, as illustrated in FIGS. 14 and 15, since the sheet wide width portion width L3 of the insulation sheet 157 is substantially the same as the holder widthwise direction inside dimension L6, the position in the front-back direction of the insulation sheet 157 in the holder 151 is regulated by fitting the wide width portion 157W into the side portion 151B. Spacings between the holder inner wall surfaces 151WS and the insulation sheet 157 are inner wall surface sheet gaps L7.

Figure 21:
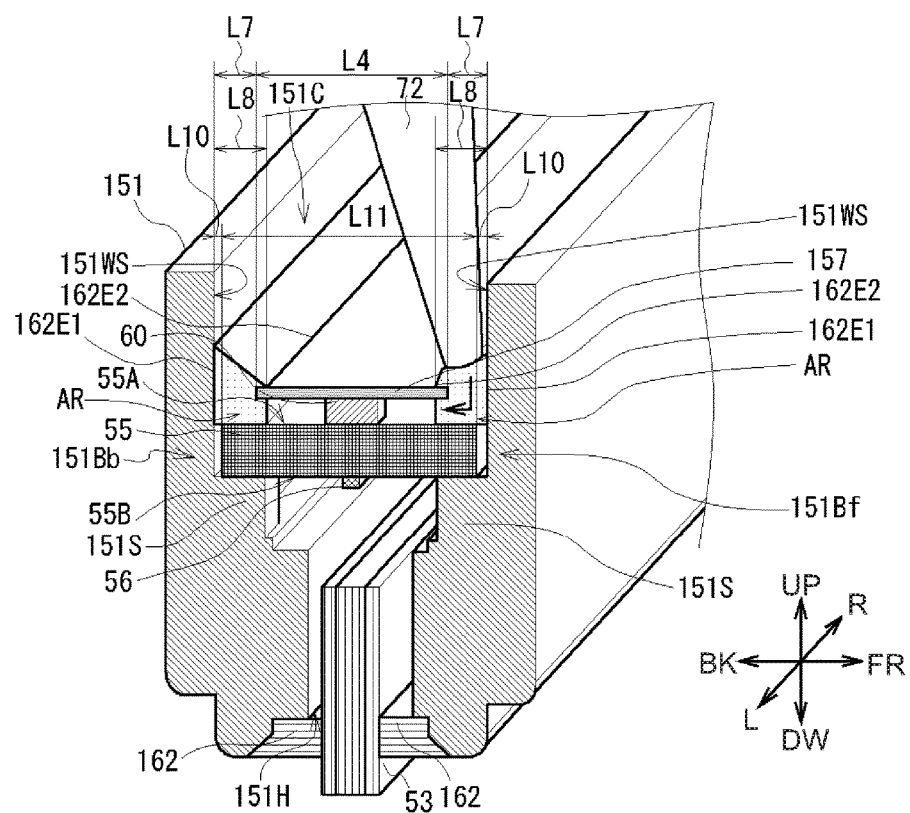
FIG. 21 is a perspective cross-sectional view illustrating an LED head manufacturing process (5) according to the second embodiment.

Next, in the LED head manufacturing processing procedure RT101, in a subsequent step SP103, as illustrated in FIG. 21, the gaps between the insulation sheet 157 and the holder 151 is sealed with the silicone resin 162 applied by using a dispenser 72 so as to be occluded. At this time, the periphery of the connector 55C is also sealed with the silicone resin 162 such that the gap between the connector 55C and the board 55 is occluded.

At this time, a nozzle diameter, applying pressure, applying speed, and the like of the dispenser 72 is adjusted such that, in the silicone resin 162, a resin application width L8 that is a width from a resin end 162E1 as an end on a side of one holder inner wall surface 151WS to a resin end 162E2 as an end on a side towards the other holder inner wall surface 151WS, in other words, a width in the front-back direction of the silicone resin 162, becomes wider than each inner wall surface sheet gap L7. Thus, in a position where the LED head 116 corresponds to the narrow width portion 157N of the insulation sheet 157 in the right-left direction, the inner wall surface sheet gap L7<the resin application width L8 is satisfied. Since the inner wall surface sheet gap L7<the resin application width L8 is satisfied, part of the silicone resin 162 is applied on the insulation sheet 157. In this embodiment, the inner wall surface sheet gap L7 is 0.7 mm, and the resin application width L8 is 1 mm, respectively. The inner wall surface sheet gap L7 is larger than each inner wall surface board gap L10.

In this way, in the LED head 116, areas AR in which the inner wall surface sheet gaps L7 are smaller than the resin application widths L8 are formed. In the LED head 116, each area AR is continuously formed across a region of 70% or more of the length in the longitudinal direction of the insulation sheet 157.

Since the sheet narrow width portion width L4 is shorter than the board width L11, the silicone resin 162 that is not applied to the insulation sheet 157 and exists in an area between the holder inner wall surfaces 151 WS and the front and back ends of the board 55 reaches the board 55, and moves to surround the electronic part arrangement surface 55A of the board 55 as indicated by an arrow in FIG. 21. Since the silicone resin 162 is applied in such a way as to sandwich the insulation sheet 157 from the up-down directions as described above, the insulation sheet 157 is less likely to be removed.

Next, in the LED head manufacturing processing procedure RT101, in a subsequent step SP104, as illustrated in FIG. 11, the electronic parts 60, which are mounted in the positions in the right-left direction that are the same as the positions of the abutment portions 151S of the holder 151, are pressed downward by using the jig 70 with the insulation sheet 157 interposed in between, and are kept in the state where the board 55 is abutted on the abutment portions 151S of the holder 151 until the silicone resin 162 is cured. Thus, the board 55 and the insulation sheet 157 are fixedly bonded to the holder 151, and then the procedure proceeds to step SP105.

However, since there are only slight gaps between the wide width portions 157W of the two ends in the right-left direction of the insulation sheet 157 and the holder inner wall surfaces 151WS, no silicone resin 162 moves to surround the board 55. In other words, if the sheet wide width portion widths L3 of the wide width portions 157W are wide, at the two ends in the right-left direction of the LED head 116, the board 55 cannot be held by the silicone resin 162 in the holder 151. In this respect, in the LED head 116, the sheet wide width portion right-left direction region L5 extending to the outside in the right-left direction of the LED array 56 (i.e., to the LED chip mounting portion) allows a portion of the board 55 corresponding to the mounting area of the LED array 56 to be surely held. As a result, the position of the LED array 56 with respect to the rod lens array 53 can be accurately regulated. Making the LED head 116 in the above way makes it possible to completely cover the board 55 with insulation members such as the holder 151, the rod lens array 53, the silicone resin 162, and the insulation sheet 157.

Hence, in the LED head 116, after the board 55 is abutted on the abutment portions 151S of the holder 151, the gaps between the board 55 and the holder 151 are sealed with the silicone resin 162, and the electronic parts 60 are pressed by using the jig 70 with the insulation sheet 157 interposed in between until the silicone resin 162 is cured in order to fix the board 55 to the holder 151.

[2-4. Operation and Effect]

In the LED head 116 with the above configuration, the side portion 151B as wall portions extending substantially parallel to the board 55 in the longitudinal direction are formed, the holder 151 and the insulation sheet 157 are sealed with the silicone resin 162 extending along the side portion 151B, and the inner wall surface sheet gaps L7, which are distances from the side portion 151B in the widthwise direction of the holder 151 to the ends of the insulation sheet 157, include the areas AR, which are smaller than the resin application widths L8 as distances from the side portion 151B (the resin ends 162E1) to the resin ends 162E2, which are ends of the silicone resin 162 on the respective inner sides spaced in the widthwise direction from the side portion 151B. Thus, in the LED head 116, adhesiveness with respect to the holder 151 can be improved.

Figure 22:
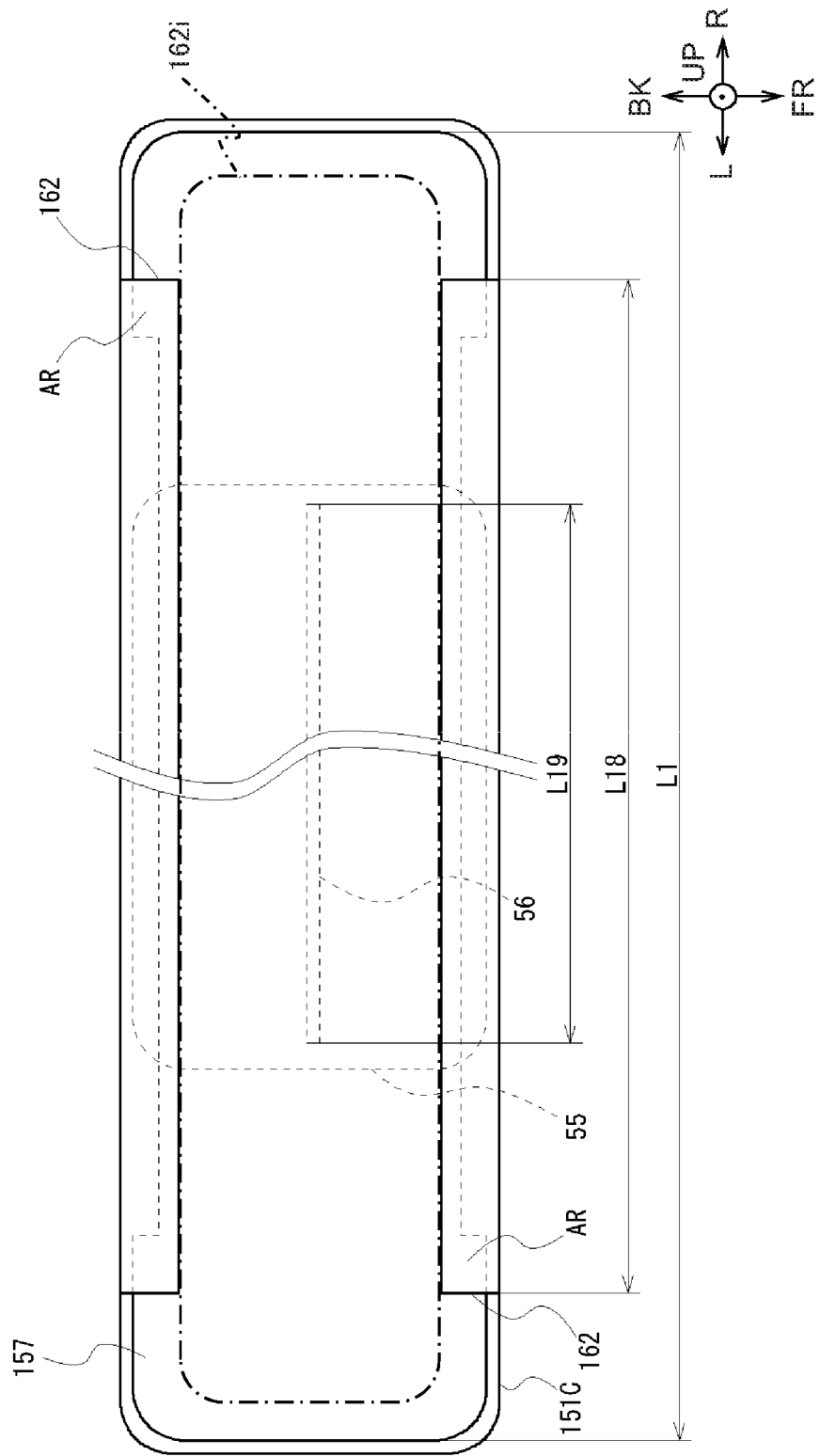
FIG. 22 is a plan view illustrating a configuration including the insulation sheet, an LED array, and a silicon resin according to the second embodiment.

In the LED head 116, each area AR is formed across the region of 70% or more of the length in the longitudinal direction of the insulation sheet 157. That is, in this embodiment, as illustrated in FIG. 22, a resin application area longitudinal direction length L18, which is a length of the area AR in the longitudinal direction of the insulation sheet 157 to which the silicone resin 162 is applied, is set as; the resin application area longitudinal direction length L18≥0.7×the insulation sheet longitudinal direction length L1. In the insulation sheet 157, as illustrated in FIG. 13, assuming that the lower surface facing the board 55 is an insulation sheet first surface 157A, the upper surface opposite to the insulation sheet first surface 157A is an insulation sheet second surface 157B, and the front and back side surfaces connecting the insulation sheet first surface 157A and the insulation sheet second surface 157B are the insulation sheet third surfaces 157C, the silicone resin 162 is applied to the area AR in such a way as to contact the insulation sheet first surface 157A, the insulation sheet second surface 157B, and the insulation sheet third surface 157C. In addition, assuming that the length of the LED array 56 arranged on the board 55 in the longitudinal direction of the board 55 is an LED array longitudinal direction length L19, the LED array longitudinal direction length L19 is set as; the resin application area longitudinal direction length L18>the LED array longitudinal direction length L19. That is, in the LED head 116, in the longitudinal direction of the board 55, it is appreciated that the silicone resin 162 is applied in such a way as to extend to the outside of the ends of the LED array 56. Note that, in this embodiment, the silicone resin 162 is provided as illustrated by a solid line in FIG. 22. However, the arrangements of the silicone resin 162 is not limited to this embodiment. For example, the silicone resin 162 may be modified to a silicone resin 162i provided along the opening 151C as illustrated by a dashed-dotted line in FIG. 22.

Further, in the LED head 116, in the areas AR, the inner wall surface sheet gaps L7, which are distances from the side portion 151B in the widthwise direction of the holder 151 to the ends of the insulation sheet 157, are longer than the inner wall surface board gaps L10, which are distances from the side portion 151B to the ends of the board 55. In this way, in the LED head 116, the insulation sheet 157 is less likely to be removed by allowing the silicone resin 162 to move to surround the electronic part arrangement surface 55A of the board 55 through the gaps between the holder inner wall surfaces 151WS and the insulation sheet 157, while preventing a failure such as that the silicone resin 162 moves to surround the LED array arrangement surface 55B.

Also in other points, the LED head 116 according to the second embodiment is able to achieve the same operation effects as the LED head 16 according to the first embodiment.

3. Other Embodiments

Figure 23:
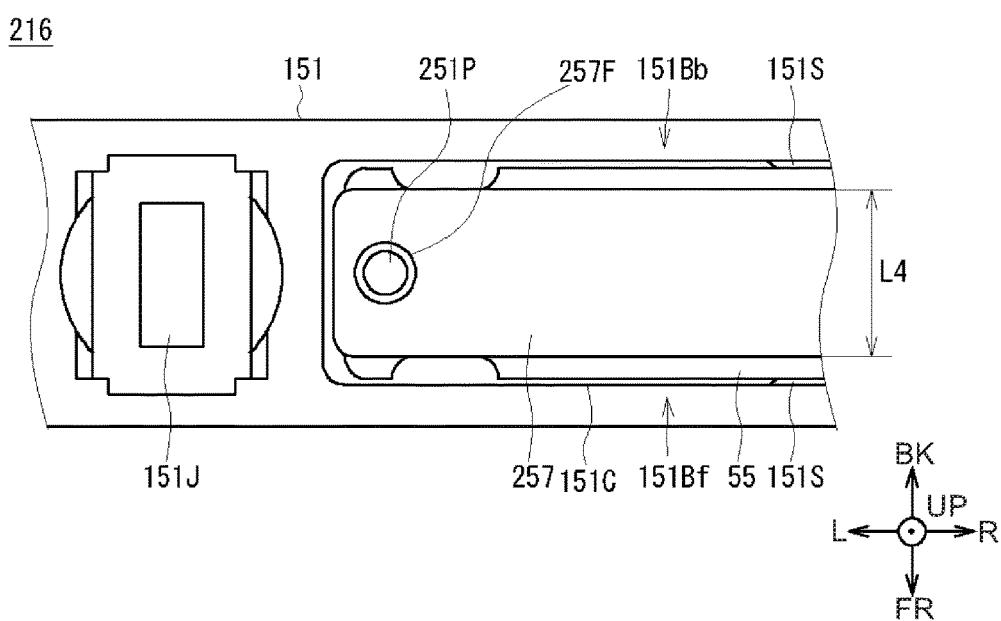
FIG. 23 is a plan view illustrating a configuration including holder and insulation sheet (1) according to another embodiment.

Note that, in the above-described second embodiment, the case of regulating the position in the front-back direction of the insulation sheet 157 in the holder 151 by fitting the wide width portions 157W into the side portion 151B is described; however, the present invention is not limited thereto. As an insulation sheet 257 of an LED head 216 illustrated in FIG. 23, positioning of the insulation sheet 257 with respect to the board 55 may be performed by: removing the wide width portions 157W from the insulation sheet 157 (FIG. 15) and thus forming the entirety of the insulation sheet 257 in a rectangular shape with rounded corners that is an almost similar shape as the holder opening 151C; drilling sheet fitting holes 257F; extending the pins 251P of the holder 151 to be longer than the pins 151P (FIG. 14) upward to a position where they interfere with the insulation sheet 257; and fitting the pins 251P into the sheet fitting holes 257F of the insulation sheet 257. In this case, the silicone resin 162 can be applied also to the outside in the front-back direction of the two ends in the right-left direction of the insulation sheet 257 on the board 55.

Figure 24:
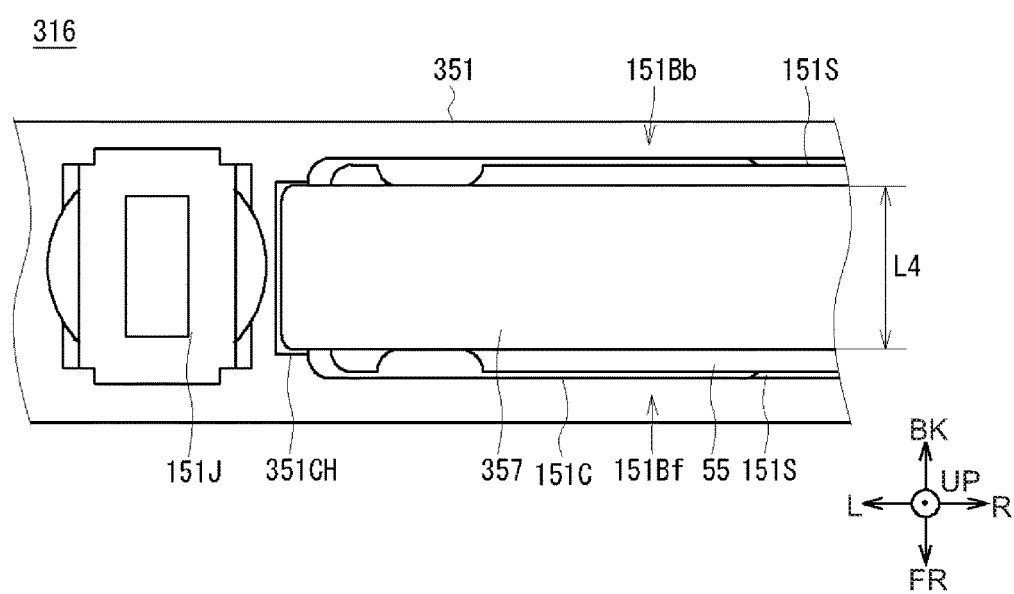
FIG. 24 is a plan view illustrating a configuration including holder and insulation sheet (2) according to yet another embodiment.

As an insulation sheet 357 of an LED head 316 illustrated in FIG. 24, positioning of the insulation sheet 357 with respect to the board 55 may be performed by: removing the wide width portions 157W from the insulation sheet 157 (FIG. 15) and thus forming the entirety of the insulation sheet 357 in a rectangular shape with rounded corners that is an almost similar shape as the holder opening 151C; forming a holder opening notch 351CH, which is the holder opening 151C with a narrower width in the front-back direction that is slightly wider than the sheet narrow width portion width L4; and fitting the two ends in the right-left direction of the insulation sheet 357 into the holder opening notch 351CH. In this case, as the case of the LED head 216, the silicone resin 162 can be applied also to the outside in the front-back direction of the two ends in the right-left direction of the insulation sheet 357 on the board 55.

Figure 25:
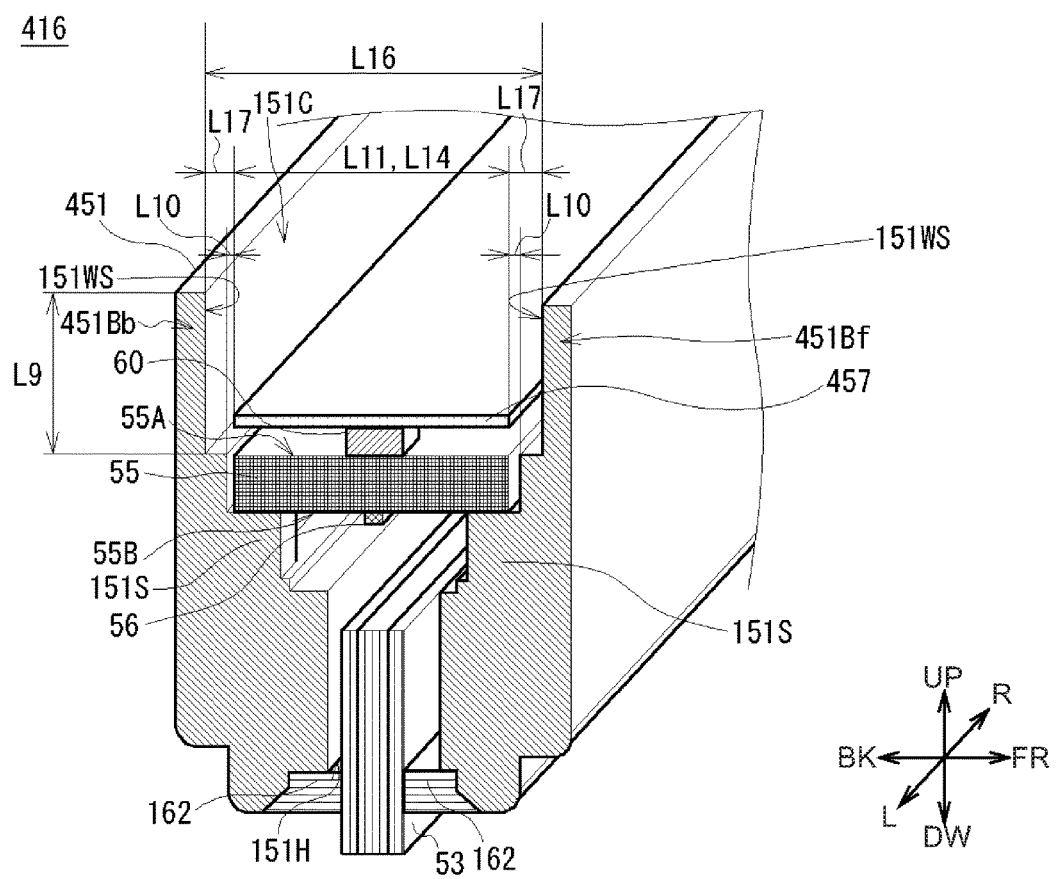
FIG. 25 is a perspective cross-sectional view illustrating a configuration of an LED head according to another embodiment.

In the above-described second embodiment, the case where the inner wall surface sheet gap L7<the resin application width L8 is satisfied when applying the silicone resin 162 to the gaps between the plane holder inner wall surface 151WS, which is across from the portion facing the lower surface of the board 55 to the upper end of the holder 151, and the insulation sheet 157 having the sheet narrow width portion width L4 shorter than the board width L11 is described; however, the present invention is not limited thereto. As an LED head 416 illustrated in FIG. 25, comparing with the case of the LED head 116, a sheet narrow width portion width L14 of the insulation sheet 457 may be wider than the sheet narrow width portion width L4 of the insulation sheet 157 to be substantially the same as the board width L11, while a thickness of portions in a side portion 451Bf and a side portion 451Bb of a holder 451 facing the insulation sheet 457 in the front-back direction may be respectively thinner than the side portion 151Bf and the side portion 151Bb, a holder widthwise direction inside dimension L16 may be wider than the holder widthwise direction inside dimension L6 of the holder 151, and inner wall surface sheet gaps L17 may be narrower than the inner wall surface sheet gaps L7. However, it is preferable that a holder inside dimension enlarged region L9, which is a region in the up-down direction from the upper end of the board 55 towards downward in the portion where the holder widthwise direction inside dimension L16 is expanded in the front-back direction, is not beyond the upper surface of the board 55. In this way, the silicone resin 162 (FIG. 21) is less likely to be moved to surround the front and back side surfaces of the board 55 while likely to be moved to surround the upper surface of the board 55, and thus the holding power of the board 55 can be increased.

In the above-described second embodiment, the case of forming each area AR in the region of 70% or more of the length in the longitudinal direction of the insulation sheet 157 is described; however, the present invention is not limited thereto. The area AR may be formed in a region having various lengths in the longitudinal direction of the insulation sheet 157.

In the above-described first embodiment, the case of using the electronic parts 60 all of which having the same shape; however, the present invention is not limited thereto. Not all the electronic parts 60 should be in the same shape as long as at least the heights of all the electronic parts 60 are the same. Even if the heights of all the electronic parts 60 are not the same, the insulation sheet 57 can be pressed against the electronic parts 60 while the position in the up-down direction of the lower surface of the jig 70 corresponds to the height of each of the electronic parts 60. This is also applicable to the second embodiment.

In the above-described first embodiment, the case where the electronic parts 60 include the chip condensers is described; however, the present invention is not limited thereto. The electronic parts 60 may include various electronic parts such as chip resistances, chip coils, and integrated circuits (ICs). In this case, it is preferable that the electronic parts 60 have no functional problem for being arranged in regular intervals in the longitudinal direction of the board 55. This is also applicable to the second embodiment.

In the above-described first embodiment, the case of mounting the electronic parts 60 functioning as electronic parts is described; however, the present invention is not limited thereto. Low priced dummy parts imitating only the shapes of the electronic parts and not functioning as the electronic parts may be mounted. In this case, a combination of the electronic parts 60 functioning as the electronic parts and the dummy parts may be mounted, or only the dummy parts may be mounted. In this case, comparing with the case of using the electronic parts 60 as all the electronic parts, the cost is reduced. This is also applicable to the second embodiment.

In the above-described first embodiment, the case of arranging the electronic parts 60 in the longitudinal direction of the board 55 with regular intervals in the longitudinal direction is described; however, the present invention is not limited thereto. The electronic parts 60 may be arranged in the longitudinal direction of the board 55 with different intervals in the longitudinal direction. This is also applicable to the second embodiment.

In the above-described first embodiment, the case of arranging the electronic parts 60 in such a way as to be aligned along the right-left direction while their positions in the front-back direction are aligned is described; however, the present invention is not limited thereto. The electronic parts 60 may be arranged in such a way as to be aligned along the right-left direction while their positions in the front-back direction are not aligned. In this case, in order to not avoid the silicone resin 62 to be applied to the gaps between the holder 51 and the board 55, the electronic parts 60 are preferably arranged in inner portions of the board 55 with a margin of 1 mm or more from the ends of the board 55 in the front-back direction thereof. This is also applicable to the second embodiment.

In the above-described first embodiment, the case of arranging four electronic parts 60 is described; however, the present invention is not limited thereto. Any number, at least two, of the electronic parts 60 may be arranged. This is also applicable to the second embodiment.

In the above-described first embodiment, the case of arranging one electronic part 60 on the right side that is outside in the right-left direction of the connector 55C arranged in the vicinity of the right end of the board 55 is described; however, the present invention is not limited thereto. Any number, two or more, of the electronic parts 60 may be arranged on the right side of the connector 55C. This is also applicable to the second embodiment.

In the above-described first embodiment, the case where the insulation sheet 57 includes Mylar (registered trademark) is described; however, the present invention is not limited thereto. The insulation sheet 57 may include another sheet made of resin having the insulation property. This is also applicable to the second embodiment.

In the above-described first embodiment, the case where the insulation sheet 57 has the insulation property is described; however, the present invention is not limited thereto. The insulation sheet 57 may be made of a material having no insulation property if, for example, a material having the insulation property is applied to the upper surface of the board 55. In this case, the insulation sheet 57 may physically protect the upper surface of the board 55 without avoiding electrical operations on the board 55. This is also applicable to the second embodiment.

In the above-described first embodiment, the case where the entire surface of the electronic part arrangement surface 55A of the board 55 is covered with the insulation sheet 57 is described; however, the present invention is not limited thereto. At least part of the electronic part arrangement surface 55A of the board 55 may be covered with the insulation sheet 57. This is also applicable to the second embodiment.

In the above-described first embodiment, the case of making the holder 51 by metallic molding a liquid crystal polymer is described; however, the present invention is not limited thereto. For example, the holder 51 may be manufactured with various manufacturing methods such as making from other various kinds of resin, making by cutting or aluminum die casting, and making by outsert molding resin to a sheet metal. This is also applicable to the second embodiment.

In the above-described first embodiment, the case of forming the abutments portions 51S on only positions that correspond to the positions in the right-left direction of the electronic parts 60 in the holder 51 is described; however, the present invention is not limited thereto. The abutment portions 51S may be formed in positions that do not correspond to the positions in the right-left direction of the electronic parts 60 in the holder 51 like a case of forming the abutment portions 51S continuously across from the left end to the right end in the holder 51. In this case, the flatness with respect to the horizontal direction may be formed continuously along the longitudinal direction of the holder 51. That is, the abutment portions 51S may be formed at least in positions including at least the electronic parts 60 in the longitudinal direction in the holder 51. This is also applicable to the second embodiment.

In the above-described first embodiment, the case where the gaps between the holder 51 and the rod lens array 53 as well as the gaps between the holder 51 and the board 55 are filled up with the silicone resin 62 is described; however, the present invention is not limited thereto. The gaps between the holder 51 and the rod lens array 53 as well as the gaps between the holder 51 and the board 55 may be filled up with members made of other various materials. This is also applicable to the second embodiment.

In the above-described first embodiment, the case of applying the present invention to the LED head 16 of each color associating with the image formation unit 15 of the corresponding color linearly arranged along the front-back direction in the tandem color printer 1 is described; however, the present invention is not limited thereto. The present invention may be applied to an LED head equipped in other various types of color printer such as a four-cycle type, for example. This is also applicable to the second embodiment.

In the above-described first embodiment, the case of attaching four of LED head 16 respectively corresponding to the colors yellow, magenta, cyan, and black to the printer housing 2 of the color printer 1 that performs color printing is described; however, the present invention is not limited thereto. For example, three or less or five or more LED heads 16 may be attached to the printer housing 2 depending on the number of colors of the toner used in the color printer, or, one LED head 16 may be attached to a monochrome printer that performs monochrome printing. This is also applicable to the second embodiment.

In the above-described first embodiment, the present invention is applied to the color printer 1 as an image formation apparatus; however, the present invention is not limited thereto. The present invention can also be applied to an apparatus such as a facsimile, a multi-function printer (MFP), and a copier as long as the apparatus has the LED head 16 like the color printer 1 does. This is also applicable to the second embodiment.

The present invention is not limited to the above-described embodiments and other embodiments. That is, the scope of application of the present invention includes an embodiment that is a part of or a combination of all of the above-described embodiments and the other embodiments, and also an embodiment that is an extracted part.

In the above-described first embodiment, the case where the LED head 16 as an exposure apparatus has a configuration including the board 55 as a board or a board member, the rod lens array 53 as a lens member, the holder 51 as a holder or a holder member, and the insulation sheet 57 as an insulation sheet, and the color printer 1 as an image formation apparatus has a configuration having this LED head 16 is described; however, the present invention is not limited thereto. The exposure apparatus may have a configuration including a board, a lens member, a holder, and an insulation sheet configured in other various ways, and the image formation apparatus may have a configuration having this exposure apparatus. This is also applicable to the second embodiment.

The present invention can be used in an LED head equipped in an electrophotographic printer, for example.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An exposure apparatus comprising:
   a board comprising a first surface on which a plurality of light emitting elements are arranged along a first direction and a second surface opposite to the first surface;
   a lens member on which light from the plurality of light emitting elements is incident;
   a holder holding the lens member; and
   an insulation sheet comprising an insulation material, wherein
   the board comprises an abutment part provided on the second surface of the board,
   the abutment part is arranged on the substantially center of the board in a second direction orthogonal to the first direction, and comprises a continuous surface arranged at a position protruding from the second surface from one end side to an other end side of at least one of the plurality of light emitting elements in the second direction, and
   the insulation sheet is fixed to the holder while being in contact with the continuous surface of the abutment part.

2. The exposure apparatus according to claim 1, wherein the abutment part comprises a plurality of abutment parts arranged along a longitudinal direction of the board,
   the holder is formed with abutments portions, the abutment portions of the holder provided in positions at least partially corresponding to the abutment parts in a longitudinal direction of the holder, and
   the board is fixed to the holder while being in contact with the abutment portions of the holder.

3. The exposure apparatus according to claim 2, wherein the abutment portions of the holder are provided in the same positions as the abutment parts of the board in the longitudinal direction of the holder.

4. The exposure apparatus according to claim 1, wherein the insulation sheet maintains a constant gap from the board, such that the insulation sheet is fixed to the holder while being in contact with the abutment part of the board and covering over the second surface of the board.

5. The exposure apparatus according to claim 4, wherein the board is bonded to the holder with a sealing material.

6. The exposure apparatus according to claim 1, wherein the board comprises a connector,
the abutment part comprises a plurality of the abutment parts, and
at least one of a plurality of the abutment parts is arranged outside the connector in a longitudinal direction of the board.

7. The exposure apparatus according to claim 1, wherein a height of the abutment part from the board is higher than any other electronic parts mounted on the board.

8. The exposure apparatus according to claim 2, wherein the abutment parts have the same height from the board.

9. The exposure apparatus according to claim 8, wherein the abutment parts have the same profile.

10. The exposure apparatus according to claim 2, wherein the abutment parts are electronic parts.

11. The exposure apparatus according to claim 10, wherein
the abutment parts include a dummy part that does not function as the electronic parts.

12. The exposure apparatus according to claim 1, wherein the abutment part is arranged in an inner portion of the board with a margin of 1 mm or more from widthwise ends of the board along a widthwise direction of the board orthogonal to a longitudinal direction of the board.

13. The exposure apparatus according to claim 1, wherein
the holder comprises a wall portion extending in a longitudinal direction of the holder and substantially in parallel to the board,
the holder and the insulation sheet are sealed with a sealing material extending along the wall portion,
the insulation sheet comprises an insulation sheet first surface facing the board and an insulation sheet second surface opposite to the insulation sheet first surface, and
the sealing material comprises an area that contacts the insulation sheet first surface and the insulation sheet second surface.

14. The exposure apparatus according to claim 13, wherein
the area is formed in a range of 70% or more of a longitudinal length of the insulation sheet.

15. The exposure apparatus according to claim 13, wherein
in the area, a distance from the wall portion to a widthwise end of the insulation sheet is greater than a distance from the wall portion to a widthwise end of the board.

16. The exposure apparatus according to claim 13, wherein
the sealing material extends to an outside of an end of the light emitting element in the longitudinal direction.

17. The exposure apparatus according to claim 13, wherein
the insulation sheet comprises an insulation sheet third surface that connects the insulation sheet first surface and the insulation sheet second surface, and
the sealing material contacts the insulation sheet third surface in the area.

18. An image formation apparatus comprising the exposure apparatus according to claim 1.

19. A method of manufacturing an exposure apparatus, comprising:
assembling a board that includes a first surface on which a plurality of light emitting elements are arranged along a first direction and a second surface opposite to the first surface and a holder that holds a lens member on which light from the plurality of light emitting elements are incident, and
pressing an insulation sheet against an abutment part provided on the second surface of the board, thereby fixing the insulation sheet to the holder with the insulation sheet in contact with the abutment part, wherein
the abutment part is arranged on the substantially center of the board in a second direction orthogonal to the first direction, and comprises a continuous surface arranged at a position protruding from the second surface from one end side to an other end side of at least one of the plurality of light emitting elements in the second direction.

20. A method of manufacturing an exposure apparatus, comprising:
assembling a board that includes a first surface on which a plurality of light emitting elements are arranged along a first direction and a second surface opposite to the first surface and a holder that holds a lens member on which light from the plurality of light emitting elements are incident;
applying a sealing material between the board and the holder; and
curing the sealing material while pressing an insulation sheet against an abutment part provided on the second surface of the board and against the sealing material, thereby fixing the board to the holder and fixing the insulation sheet to the holder by means of the cured sealing material with the insulation sheet in contact with the abutment part, wherein
the abutment part is arranged on the substantially center of the board in a second direction orthogonal to the first direction, and comprises a continuous surface arranged at a position protruding from the second surface from one end side to an other end side of at least one of the plurality of light emitting elements in the second direction.

* * * * *